US012130805B2

(12) United States Patent
Roberts

(10) Patent No.: US 12,130,805 B2
(45) Date of Patent: *Oct. 29, 2024

(54) XBUNDLE: A HIERARCHICAL HYPERGRAPH DATABASE DESIGNED FOR DISTRIBUTED PROCESSING

(71) Applicant: Michael Roberts, Austin, TX (US)

(72) Inventor: Michael Roberts, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/419,905

(22) Filed: Jan. 23, 2024

(65) Prior Publication Data

US 2024/0184772 A1 Jun. 6, 2024

Related U.S. Application Data

(63) Continuation of application No. 17/558,493, filed on Dec. 21, 2021, now Pat. No. 11,914,578.

(51) Int. Cl.
*G06F 16/30* (2019.01)
*G06F 16/23* (2019.01)

(52) U.S. Cl.
CPC ................................ *G06F 16/2379* (2019.01)

(58) Field of Classification Search
CPC .................................................. G06F 16/2379
See application file for complete search history.

(56) References Cited

U.S. PATENT DOCUMENTS

| | | | | |
|---|---|---|---|---|
| 11,442,990 | B2 * | 9/2022 | Zimmerman | G06F 16/285 |
| 2022/0222298 | A1 * | 7/2022 | Chen | G06F 16/2379 |
| 2023/0004559 | A1 * | 1/2023 | Kreutzer | G06F 16/24534 |
| 2023/0016113 | A1 * | 1/2023 | Canim | G06F 16/9035 |
| 2023/0187068 | A1 * | 6/2023 | Boss | G16H 10/20 705/2 |

* cited by examiner

*Primary Examiner* — Khanh B Pham
(74) *Attorney, Agent, or Firm* — Shiv S. Naimpally; Flagship Patents

(57) ABSTRACT

In some aspects, a server may receive commands from a computing device. The commands may cause the server to create an empty xbundle comprising a context and create a set of additional empty xbundles within the context. The set of additional empty xbundles includes at least a first xbundle, a second xbundle, and a third xbundle. The commands may cause the server to connect the first xbundle to the second xbundle using the third xbundle to create a particular xbundle in which the first xbundle comprises a first vertex, the second xbundle comprises a second vertex, and the third xbundle comprises an edge connecting the first xbundle to the second xbundle. The commands may cause the server to save, in a datastore, the particular xbundle comprising the context that includes the first xbundle, the second xbundle, and the third xbundle.

20 Claims, 11 Drawing Sheets

XBUNDLE: A HIERARCHICAL HYPERGRAPH DATABASE DESIGNED FOR DISTRIBUTED PROCESSING

CROSS-REFERENCE TO RELATED APPLICATIONS

The present patent application is a continuation of U.S. patent application Ser. No. 17/558,493, filed on Dec. 21, 2021, entitled "Xbundle: A Hierarchical Hypergraph Database Designed for Distributed Processing" which is incorporated by reference herein in its entirety and for all purposes as if completely and fully set forth herein.

BACKGROUND OF THE INVENTION

Field of the Invention

This invention relates to xbundle, a hierarchical hypergraph database architecture that is designed for distributed processing.

Description of the Related Art

In a conventional graph model, a vertex is one endpoint of an edge, and an edge connects two vertices. However, both vertices and edges are irreducible topological primitives, with no internal structure. Thus, a conventional graph model has two fundamental elements: a vertex and an edge. However, such a model has many limitations and is not suited for modern database operations.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some aspects, a server may receive commands from a computing device. The commands may cause the server to create an empty xbundle comprising a context and create a set of additional empty xbundles within the context. The set of additional empty xbundles includes at least a first xbundle, a second xbundle, and a third xbundle. The commands may cause the server to connect the first xbundle to the second xbundle using the third xbundle to create a particular xbundle in which the first xbundle comprises a first vertex, the second xbundle comprises a second vertex, and the third xbundle comprises an edge connecting the first xbundle to the second xbundle. The commands may cause the server to save, in a datastore, the particular xbundle comprising the context that includes the first xbundle, the second xbundle, and the third xbundle.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1A:
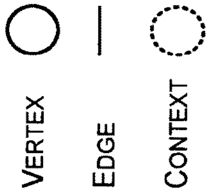
FIGS. 1A and 1B are block diagrams illustrating an xbundle architecture in which each element comprises a vertex, an edge, a context, or any combination thereof, according to some embodiments.

The systems and techniques described herein describe, xbundle, that uses a hierarchical graph data format to provide an immutable store. A graph is composed of graph fragments, known as xbundles. An xbundle may be made up of one or more additional xbundles, including the most primitive form of an xbundle, an empty xbundle. Each xbundle has one or more possible roles: (i) a vertex, (ii) an edge, (iii) a context, or any combination thereof. Because of the multiple roles that an xbundle may have, the term element is used as an equivalent to xbundle. A context is a namespace that may include zero or more children. Children in an xbundle are arranged in segments (e.g., two vertices joined by an edge) so that the children may form a graph. The role of an xbundle is typically related to a level at which the xbundle is being viewed. For example, at a lowest level, a particular element in an xbundle may function as a context while at a higher level, the particular element may function as a vertex, an edge, or both. Thus, in this example, the particular element may function as a context, a vertex, or an edge based on the level in a hierarchy from which the xbundle is being viewed. To illustrate, a context can be an edge with reference to a first pair of elements and a vertex with reference to a second pair of elements. An xbundle element can be both an edge and a vertex simultaneously. For example, an xbundle element may participate in a first segment as an edge and participate in a second segment as a vertex. An edge may participate in one or more segments, thereby enabling an xbundle to express a hypergraph in which an edge connects to one or more vertices. A context may contain zero or more segments. An xbundle element can have up to three roles, e.g., context, edge, and vertex simultaneously, with the role being based on how the xbundle element is being viewed with reference to other xbundle elements. Thus, an xbundle can be viewed as a context, an edge, and a vertex. An xbundle is self-contained and has no references to external xbundles, only to the xbundle's own children.

To connect two (or more) xbundles together to create a new graph, a new xbundle is created to include the relationship between the two (or more) xbundles. A relationship between sibling children in a context is called a segment. For example, a segment includes two vertices connected by an edge. When two xbundles acting as nodes are connected by a third xbundle acting as an edge, the edge is mapped to the origin node and to the target node. A segment is defined by the local identifiers (IDs) of the three participating xbundles (e.g., the origin, the target, and the edge), as well as the mapping between the edge, the origin and the target. The mapping specifies which child IDs of the edge correspond to child IDs in the endpoints. An xbundle is hierarchical, with xbundles included within other xbundles. An xbundle may be decomposed by resolving the segments and mappings that are included in the xbundle. By recursively resolving the child xbundles and their children, an xbundle may be decomposed to the point where all segments consist of empty xbundles that cannot be resolved further. This process of recursively resolving the child xbundles until further resolution is not possible is referred to as flattening an xbundle. A context is a workspace in which xbundle operations may be performed and that include children in the form of other xbundles (e.g., vertices, edges, and lower-level contexts).

Each xbundle may be identified in at least two ways. First, within a particular context, each xbundle has a local identifier ("id") that includes (1) a context identifier that identifies the context in which the xbundle is located, (2) a type identifier, and (3) a locally unique identifier within the context. A root identifier has a type identifier of the enclosing parent context. From there, the identifier will be a chain based on the local identifier of each succeeding level. The local identifier includes the type identifier and the locally unique identifier. Thus, a 3-level path has the form:

[top-level context type id].[child type id]-[locally unique child id].[grandchild type id]-[locally unique grandchild id]

Thus, with types A, B, and C, this appears as:

C.A-2.B-5

Here, C is the topmost context, A-2 is a child, and B-5 is a child of A-2, grandchild of C. Note that A, B and C represent hashes of the topology/children.

For example, children inside context #1 may have local identifiers 1.1, 1.2, 1.3, and so on, with the first number in "1.1" indicating context #1 and the second number indicating the local number. If an xbundle is a child of two (or more) contexts, then the xbundle has two (or more) local identifiers. For example, an xbundle that belongs to both context #1 and context #4 may have local identifier 1.1 with reference to context #1 and local identifier 2.4 with reference to context #4. When an xbundle is saved, the xbundle is associated with a type identifier that is determined based on a hash of a topology of the xbundle. The type identifier is like a model number of the xbundle. For example, if two xbundles have the same type identifier, then they are identical, with the same children connected in the same way. Thus, the type identifier is a combination of a hash of the topology and a hash of the children. In this way, the type identifier enables retrieval of a "blueprint" for a particular xbundle instance. The local identifier identifies a particular instance within an enclosing (e.g., parent) context. In some cases, the local identifier may include the type identifier (so that the blueprint for that child can be retrieved if requested) and a unique local identifier to distinguish the xbundle from other siblings of the same type. The local identifier for a particular xbundle can be any type of identifier that uniquely identifies the particular xbundle within a particular context. The chain of local identifiers is in the form of a path from the uppermost context down to the leaf xbundles at the lowest level. Unlike the local identifier, the type identifier has more constraints. The type identifier is a hash that can reflect both the topology of the xbundle and the types of the child identifiers. For example, a topology of the xbundle may be hashed separately and then a hash of the child types may be appended. In this example, the first part (the topology hash) is the same for two xbundles with children arranged in the same shape of graph, even if the child types are different. In some cases, such as when a new xbundle is being created, a context may be viewed as a workspace in which xbundle operations may be performed and that include children in form of other xbundles.

The xbundle architecture offers multiple advantages (e.g., a compared to a conventional directed graph). First, the immutable data structures facilitate parallel processing. Second, xbundle is easily scalable using any type of distributed key-value store. A distributed key-value store is designed to run on multiple computers working together and enables work larger data sets to be processed because more servers with more memory can hold the data. By distributing the store across multiple servers, processing performance may be increased. Third, hierarchical caching enables fast graph queries and searches. Fourth, xbundle gracefully degrades graph details in memory-constrained environments.

A method includes receiving, by one or more processors of a server, one or more commands from a computing device, creating an empty xbundle comprising a context, and creating a set of additional empty xbundles within the context. The set of additional empty xbundles includes at least a first xbundle, a second xbundle, and a third xbundle. The method includes connecting, by the one or more processors, the first xbundle to the second xbundle using the third xbundle to create a particular xbundle, wherein the first xbundle comprises a first vertex (having a local id that includes a context id associated with the context and a first vertex id), the second xbundle comprises a second vertex (having a local id that includes the context id and a second vertex id), and the third xbundle comprises an edge connecting the first xbundle to the second xbundle (having a local id that includes a context id and an edge id). The first vertex connected to the second vertex by the edge is referred to as a segment. A segment can be two or more vertices connected to each other by one or more edges. Each edge can be directionless, unidirectional, or bidirectional based in part on the type of data being stored. The method may include saving in a datastore, by the one or more processors, the particular xbundle comprising the context that includes the first xbundle, the second xbundle, and the third xbundle. The method may include performing a hash of a topology of the particular xbundle and sending the hash and an indication that the particular xbundle was saved to the computing device. The method may include associating the hash with the particular xbundle. The hash includes a unique type identifier to identify a type (e.g., including the topology) of the particular xbundle. The method may include retrieving, using the hash, the particular xbundle from the datastore, modifying the particular xbundle to create a modified xbundle, and based at least in part on receiving a save command, saving the modified xbundle in the datastore such that the datastore includes both the particular xbundle and the modified xbundle. For example, modifying the particular xbundle to create the modified xbundle may include adding a new child to the particular xbundle, deleting a current child from the particular xbundle, or any combination thereof. As another example, modifying the particular xbundle to create the modified xbundle may include adding a new edge to the particular xbundle, deleting a current edge from the particular xbundle, or any combination thereof. The method may include receiving, from the computing device, an add-child command that includes: a first identifier associated with a first previously stored xbundle, and a second identifier associated with a second previously stored xbundle, and adding the first previously stored xbundle as a child to the second previously stored xbundle.

As a second example, a memory device (e.g., one or more non-transitory computer-readable media) is capable of storing instructions executable by one or more processors to perform various operations. The operations include receiving one or more commands from a computing device, creating an empty xbundle comprising a context, and creating a set of additional empty xbundles within the context. The set of additional empty xbundles includes at least a first xbundle, a second xbundle, and a third xbundle. The operations include connecting the first xbundle to the second xbundle using the third xbundle to create a particular xbundle. The first xbundle comprises a first vertex (having a local id that includes a context id associated with the context and a first vertex id). The second xbundle comprises a second vertex (having a local id that includes the context id and a second vertex id). The third xbundle comprises an edge (having a local id that includes the context id and an edge id) connecting the first xbundle to the second xbundle. The first vertex connected to the second vertex by the edge is referred to as a segment. A segment can be two or more vertices connected to each other by one or more edges. Each edge can be directionless, unidirectional, or bidirectional based in part on the type of data being stored. The method includes saving, in a datastore, the particular xbundle comprising the context that includes the first xbundle, the second xbundle, and the third xbundle. The operations may include performing a hash of a topology of the particular xbundle and sending the hash and an indication that the particular xbundle was saved to the computing device. The operations may include associating the hash with the particular xbundle. The hash includes a unique type identifier to identify a type (e.g., including the topology) of the particular xbundle. The operations may include retrieving, using the hash, the particular xbundle from the datastore, modifying the particular xbundle (e.g., by adding a new child to the particular xbundle) to create a modified xbundle, and based at least in part on receiving a save command, saving the modified xbundle in the datastore, wherein the datastore includes both the particular xbundle and the modified xbundle. For example, the new child may include one or more additional children, with each of the one or more additional children comprising at least one of an additional vertex or an additional edge. In some cases, modifying the particular xbundle to create the modified xbundle may include adding a new edge to the particular xbundle, deleting a current edge from the particular xbundle, or any combination thereof. The operations may include receiving, from the computing device, an add-child command that includes (i) a first identifier associated with a first previously stored xbundle and (ii) a second identifier associated with a second previously stored xbundle, and adding the first previously stored xbundle as a child to the second previously stored xbundle.

As a third example, a server may include one or more processors and one or more non-transitory computer-readable storage media to store instructions executable by the one or more processors to perform various operations. The operations include receiving one or more commands from a computing device, creating an empty xbundle comprising a context, and creating a set of additional empty xbundles within the context. The set of additional empty xbundles includes at least a first xbundle, a second xbundle, and a third xbundle. The operations include connecting the first xbundle to the second xbundle using the third xbundle to create a particular xbundle in which the first xbundle comprises a first vertex (having a local id that includes a context id associated with the context and a first vertex id), the second xbundle comprises a second vertex (having a local id that includes the context id and a second vertex id), and the third xbundle comprises an edge (having a local id that includes the context id and an edge id) connecting the first xbundle to the second xbundle. The first vertex connected to the second vertex by the edge is referred to as a segment. A segment can be two or more vertices connected to each other by one or more edges. Each edge can be directionless, unidirectional, or bidirectional depending on the data being stored. The operations may include saving, in a datastore, the particular xbundle comprising the context that includes the first xbundle, the second xbundle, and the third xbundle. The operations may include performing a hash of a topology of the particular xbundle and sending the hash and an indication that the particular xbundle was saved to the computing device. The operations may include associating the hash with the particular xbundle. The hash includes a unique type identifier to identify a type of the particular xbundle. The operations may include retrieving, using the hash, the particular xbundle from the datastore, modifying the particular xbundle to create a modified xbundle, and based at least in part on receiving a save command, saving the modified xbundle in the datastore, such that the datastore includes both the particular xbundle and the modified xbundle. For example, modifying the particular xbundle to create the modified xbundle may include one or more of adding a new child to the particular xbundle, deleting a current child from the particular xbundle, adding a new edge to the particular xbundle, deleting a current edge from the particular xbundle, or any combination thereof. The first vertex includes a second segment comprising a third vertex connected to a fourth vertex by a second edge.

Figure 1A:
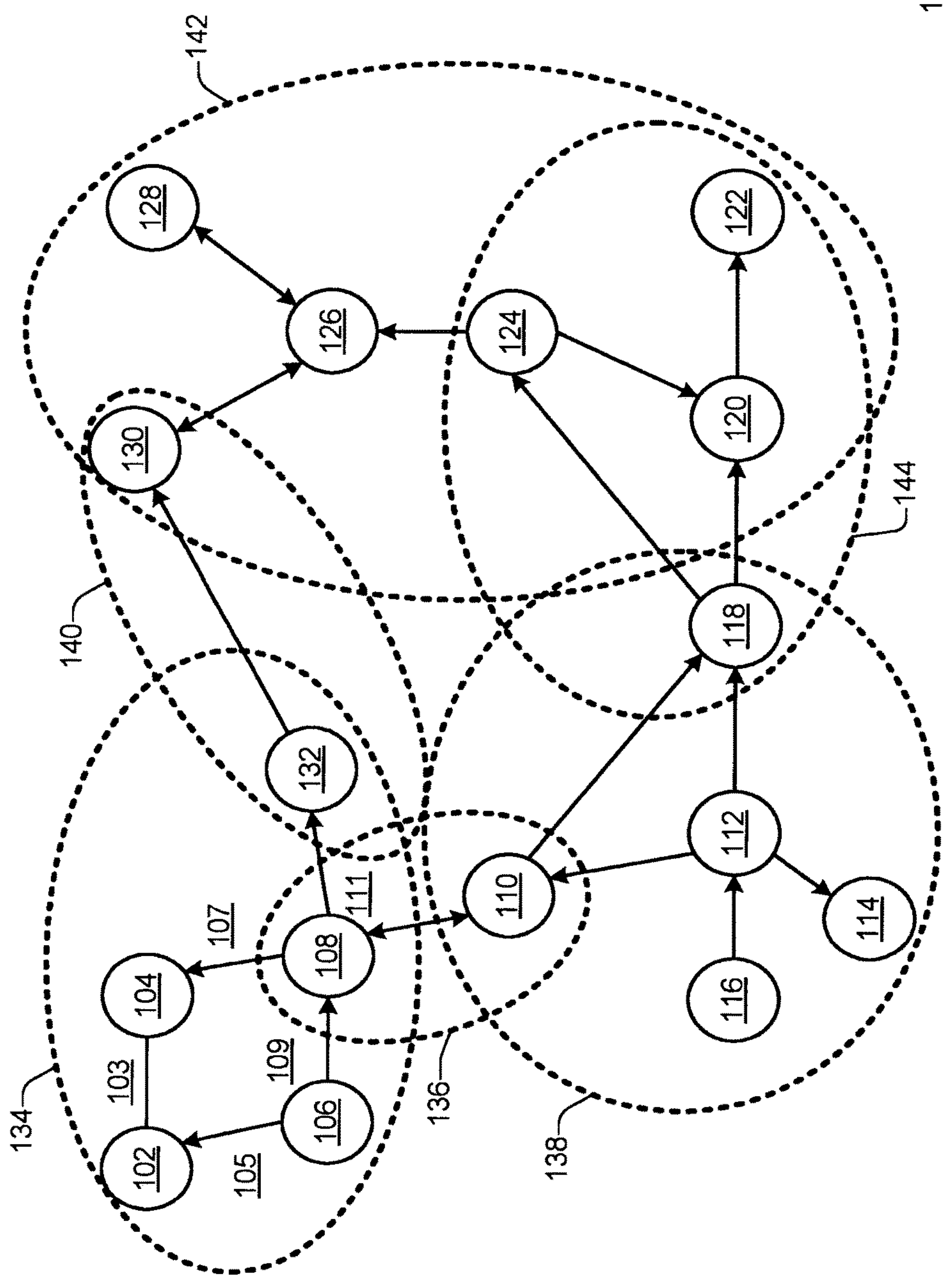
Figure 1B:
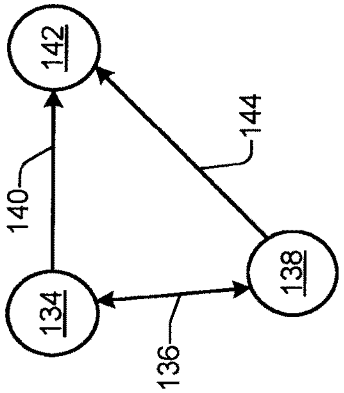

FIGS. 1A and 1B are block diagrams illustrating an xbundle architecture in which each element comprises a vertex, an edge, a context, or any combination thereof, according to some embodiments. FIG. 1A illustrates a lowest level of the xbundle architecture. Individual elements in FIG. 1A have one of three possible roles: (1) a vertex (illustrated as a circle), (2) an edge (illustrated as a line), or (3) a context (illustrated as a closed shape outlined with a dotted line). Each edge illustrates a connection between two vertices. Depending on the type of data being stored, (1) an edge may have a single direction (illustrated by a directional arrow) from a first vertex to a second vertex, (2) an edge may be bi-directional between the first vertex and the second vertex, or (3) an edge may connect a first vertex to a second vertex, without any direction. For ease of understanding, each context illustrated in FIG. 1 uses an ellipse. However, it should be understood that another closed geometric shape, such as a circle, hexagon, octagon, or the like may be used instead of or in addition to an ellipse to illustrate a context.

In FIG. 1, vertices 102, 104, 106, 108, and 132 are located in a context 134. In the context 134, there is an edge 103

(without a direction) connecting vertex 102 and vertex 104, an edge 105 going from vertex 106 to vertex 102, an edge 107 going from vertex 108 to vertex 104, an edge 109 going from vertex 106 to vertex 108, and an edge 111 going from vertex 108 to vertex 132. For ease of understanding, while the remaining edges (e.g., in other contexts) are not numbered, they can be identified based on the vertex on either side of each of the edges.

In the xbundle architecture, an edge may have no direction, one direction, or two directions, at any level. At a simplest level, two empty xbundle elements are vertices (e.g., 102, 108) and one empty xbundle is the edge (e.g., 109) between the two vertices. If the edge has a direction, then the direction may be stored as Origin/Target/Edge (e.g., 106/108/109). In some cases, the directionality of the edge E may be application-specific. For example, if two compound vertices A and B (e.g., 108, 110) are connected by a compound edge E, then E can be reduced to two edges, e.g., a first edge going from A to B (e.g., 108 to 110) and a second edge going from B to A (e.g., 110 to 108). Whether the edge E has a direction and if so, whether it has one or two directions depends on the type of data being stored, e.g., what the xbundle architecture represents or how the data is being used. For example, if the edge E represents a road, then E may have one direction when representing a one-way street and two directions when representing a two-way street. If the edge represents a type of flow (e.g., cash flow, a hierarchical flow, or the like), then the edge E may have a single direction that indicates the direction of the flow. Thus, the edges are used to illustrate a relationship between two vertices. How that relationship is represented is based on the application, e.g., the relationship between the elements that are being represented.

In some cases, at the lowest level, all edges may be directional. However, if the data being stored doesn't use directionality (e.g., directionality is not being represented), then any directionality associated with an edge may be ignored. For example, an edge going from vertex A to vertex B may be stored as A:B:E, but if directionality is not being represented then the order of A and B is ignored and the edge may alternately be stored as B:A:E. If directionality is being represented, then depending on the direction of the edge, either A:B:E or B:A:E may be stored, as corresponds to the desired direction. If the edge is intended to be bi-directional and other edges can be unidirectional, then both A:B:E and B:A:E are stored. If the link is bidirectional but all links are considered bi-directional, e.g., directionality doesn't matter, then the edge can be stored either as A:B:E or as B:A:E.

Context 136 includes vertex 108 and vertex 110 that are connected via a bidirectional edge. Context 138 includes vertex 110, vertex 112, vertex 114, vertex 116, and vertex 118. Note that vertex 110 is in three contexts, e.g., context 134, context 136, and context 138. Thus, a vertex may be in one or more contexts. In the context 138, an edge goes from vertex 116 to vertex 112, an edge goes from vertex 112 to vertex 114, an edge goes from vertex 112 to vertex 110, an edge goes from vertex 110 to vertex 118, and an edge goes from vertex 112 to vertex 118.

Context 140 includes vertex 132 and vertex 130, with an edge going from vertex 132 two vertex 130. Context 142 includes vertex 120, vertex 122, vertex 124, vertex 126, vertex 128, and vertex 130. Vertex 130 is common to context 140 and context 142. Context 144 includes vertex 118, vertex 120, vertex 122 and vertex 124. Vertex 120, vertex 122, and vertex 124 are members of context 142 and context 144. A bidirectional edge connects vertex 126 to vertex 130 and vertex 126 to vertex 128. An edge goes from vertex 124 to vertex 120. An edge goes from vertex 122 vertex 122. An edge goes from vertex 118 to vertex 120. An edge goes from vertex 118 to vertex 124. An edge goes from vertex 124 to vertex 126.

FIG. 1B illustrates one example of how the xbundle of FIG. 1A may be viewed at a higher level. The contexts 134, 136, 138, 140, 142, 144 of FIG. 1A may function, in FIG. 1B, as either vertices or edges. For example, in FIG. 1B, 134, 138, and 142 are vertices while 136 is an edge going from vertex 138 to vertex 134, 140 is a bi-directional edge between vertex 134 and vertex 142, and 144 is an edge going from vertex 138 to vertex 142. Thus, an element that functions one way (e.g., a context) in one level may function a different way (e.g., as a vertex or an edge) at another (e.g., higher) level.

Thus, in an xbundle, an element may function as a vertex, an edge, a context, or any combination thereof, depending on what level the xbundle is being viewed from. An edge may have no direction, one direction, or two directions (bidirectional). An edge connects a first vertex to a second vertex. A vertex may be included in (e.g., a member of) more than one context. An edge may be included in (e.g., a member of) more than one context. At a lowest level, an element in an xbundle is either a vertex or an edge. One level up, an element can also be a context. The context can function as a vertex, an edge, or both at higher levels.

Figure 2:
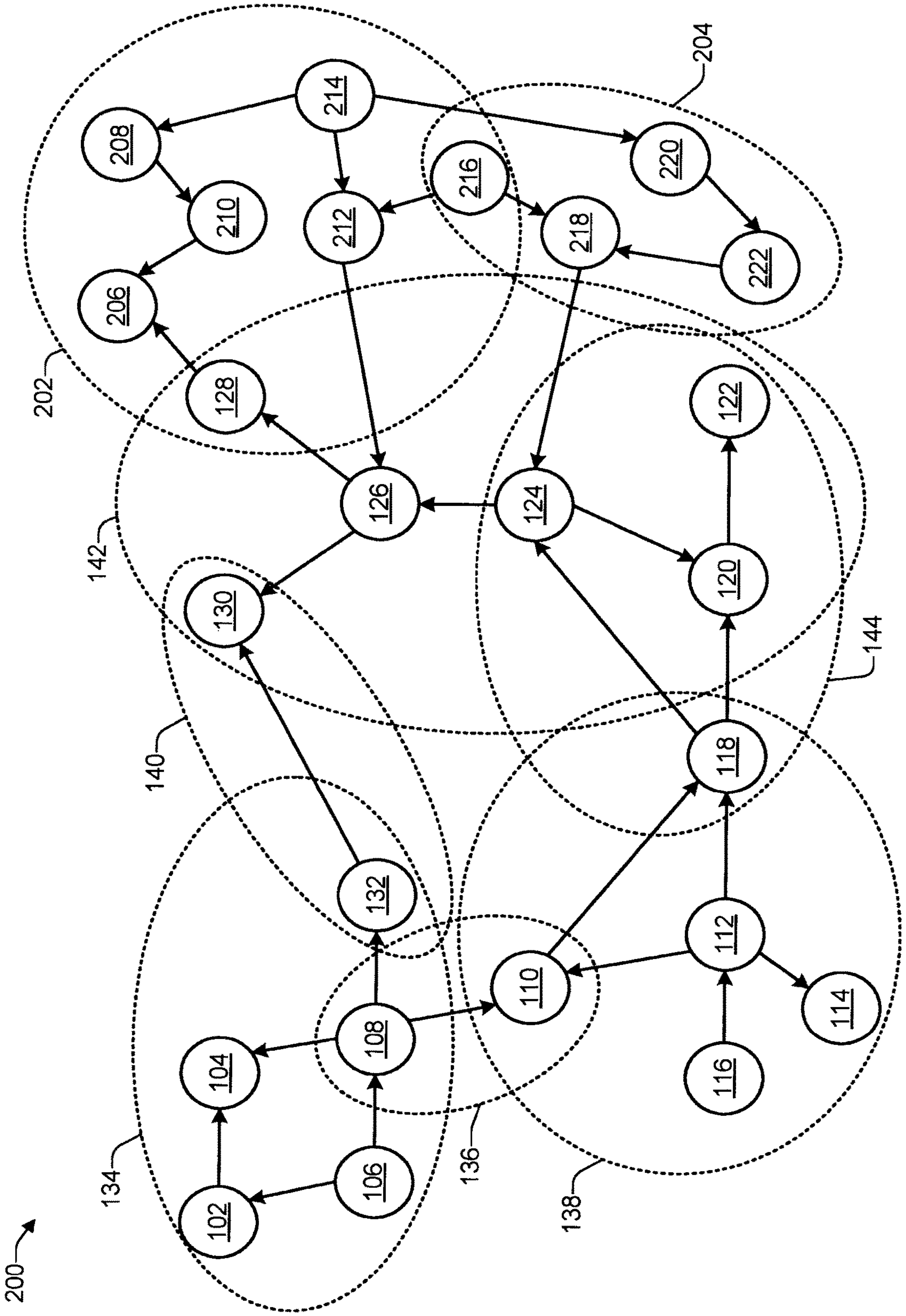
FIG. 2 is a block diagram illustrating how an xbundle can be scaled, according to some embodiments.

FIG. 2 is a block diagram illustrating how an xbundle can be scaled, according to some embodiments. FIG. 2 illustrates how the xbundle of FIG. 1 may be scaled to include additional elements. For example, contexts 202 and 204 may be added to the contexts 134, 138, 140, 142, 144. Context 202 includes vertices 128, 206, 208, 210, 212, 214, and 216 as well as the edges illustrated in FIG. 2. Context 204 includes vertices 216, 218, 220, and 222 as well as the edges illustrated in FIG. 2.

An xbundle includes zero or more segments. An xbundle with zero segments is an empty xbundle. Each segment includes at least two vertices, an edge connecting the at least two vertices, and a set of mappings describing how the edge connects to each of the vertices (e.g., endpoints of the edge), e.g., an edge going from vertex 1 to vertex 2. When the vertices and the edge are each empty, the mappings are also empty and may not be specified.

A simple segment is one where the vertices and edge are all empty xbundles. A complex segment is a segment with an edge or vertices that have children. In a complex segment in which participating xbundles are not empty and have child xbundles, a mapping describes which children of an edge correspond to children in endpoint vertices. For example, looking at contexts 134, 136, 138, the vertex 108 (e.g., child #4) in context 134 (e.g., a vertex at a higher level) is also a child (e.g., child #1) in context 138 (e.g., an edge at a higher level). Vertex 110 (e.g., child #1) in context 138 (e.g., a vertex at a higher level) is also a child (child #2) in context 136 (e.g., an edge at a higher level).

A mapping in which children are identical is considered an identity mapping. Such a mapping may be used in a reference implementation. The identity mapping assumes that any children mapped to each other have the same xbundle type and so are identical. If the two mapped children are of different types (e.g., not identical), they can still be mapped but the resulting segment will not be resolvable, e.g., the resulting segment cannot be broken down into a graph of all the children of the three segment xbundles (e.g., see FIG. 1B in which 134 is vertex 1, 138 is vertex 2, and 136 is a bidirectional edge between vertex 1 and vertex 2). For example, if 108 as child #4 of vertex #1

(e.g., context 134) and 108 as child #1 of the edge (e.g., context 136 viewed as an edge between vertex 134 and vertex 138) are of different types (e.g., have different topology and children), then an Identity Mapping will be unresolvable, because without additional guidance on which of the two types controls (or alternatively how they can be blended), there is no way for the default resolver of the reference implementation to proceed. Of course, other mappings besides the Identity Mapping may be used, along with a corresponding resolution mechanism. For example, a mapping may be expressed as a transformation of one xbundle type into another xbundle type, or as a connection between two xbundle types. A mapping itself could even be expressed as an xbundle. Thus, two identical xbundles (e.g., same children in the same graph topology) are said to be of the same type (and they have the same type identifier). By analogy, if there are two red trucks that appear identical (e.g., same year, same make, same model, same color, same options, and the like), and a toll booth records a red truck going through the toll with a first license plate (e.g., first local id), and then records another red truck going through the toll 30 minutes later with a second license plate (e.g., second local id), the toll doesn't know they are the same vehicle unless someone provides a mapping showing that the two license plates (local ids) were actually on the same truck.

Figure 3A:
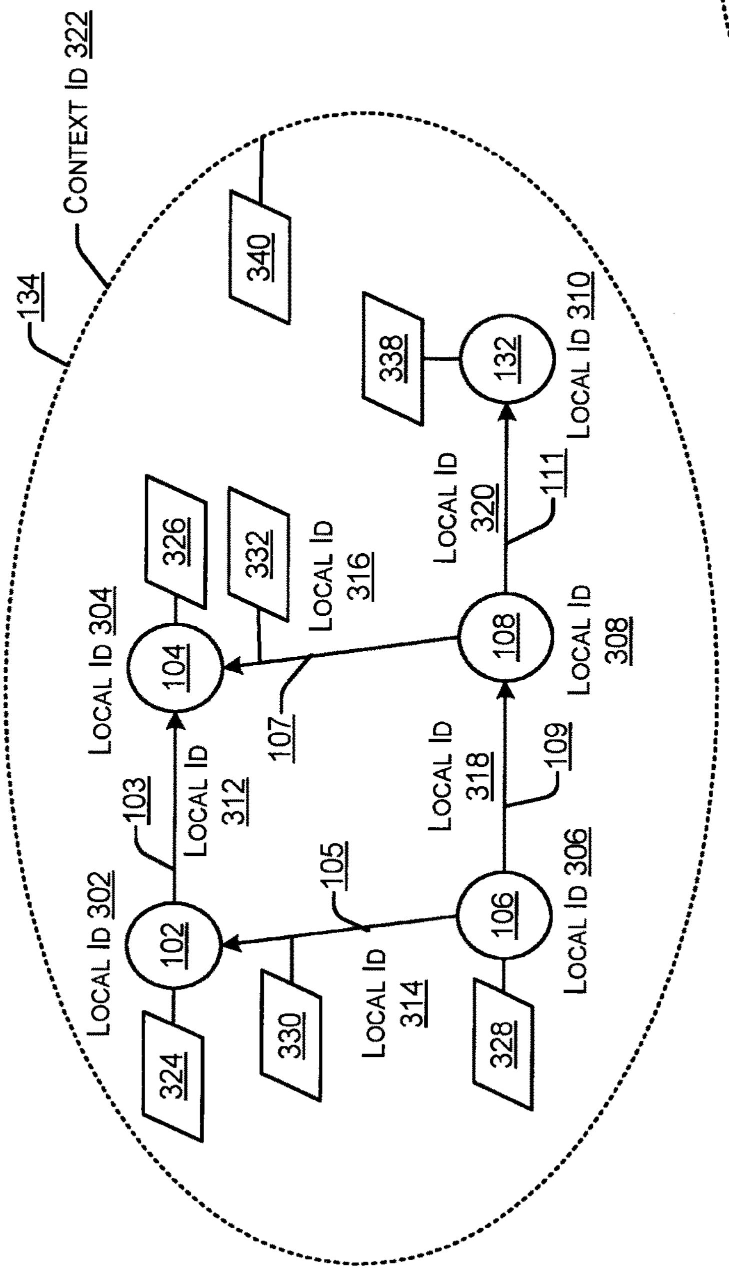
FIG. 3A and FIG. 3B illustrate an example of individual identifiers in a single context, according to some embodiments.
Figure 3B:
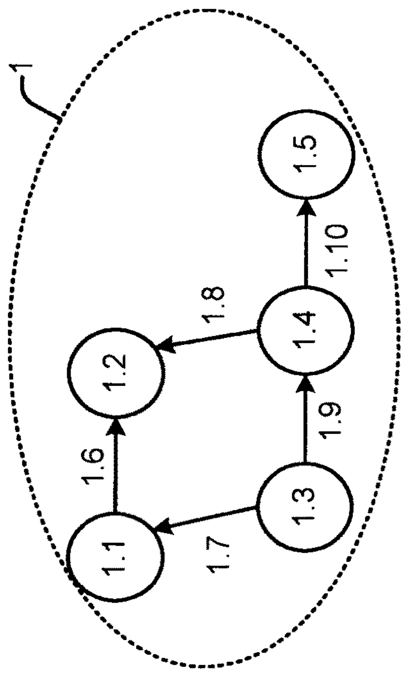

FIG. 3A and FIG. 3B illustrate an example of individual identifiers in a single context, according to some embodiments. In an xbundle, such as the xbundle illustrated in FIG. 3A, each element (vertex, edge, and context) has an individual identifier (e.g., namespace), as illustrated in FIG. 3B.

In xbundle, each vertex has a local identifier (Id). For example, in FIG. 3A, vertex 102 has a local identifier 302, vertex 104 has a local identifier 304, vertex 106 has a local identifier 306, vertex 108 has a local identifier 308, and vertex 132 has a local identifier 310. In xbundle, each edge has a local identifier. For example, in FIG. 3A, edge 103 has a local identifier 312, edge 105 has a local identifier 314, edge 107 has a local identifier 316, and edge 111 has a local identifier 320. In xbundle, each context has a context identifier. For example, in FIG. 3A, context 134 has a context identifier 322.

In xbundle, each element may have one or more attributes (e.g., text, multimedia data, a description, a photograph, an illustration, a graphical image, a video file (e.g., a "how to use" video), an audio file, a color, a size, a shape, dimensions, a region, or any other type of attributes associated with an item that is being represented by each element). For example, vertex 102 may have attributes 324, vertex 104 may have attributes 326, vertex 106 may have attributes 328, vertex 132 may have attributes 338, edge 105 may have attributes 330, edge 107 may have attributes 332, and context 134 may have attributes 340. Not all elements may have associated attributes. To illustrate, an xbundle may represent a car, with multiple contexts in the xbundle representing multiple sub-assemblies of the car, such as the engine, the drivetrain, the chassis, the electrical system, and the like. The engine context may include multiple components that are used to assemble the engine, with the attributes of each component describing each component. For example, a machine screw may have attributes that include a length of the screw, a diameter of the screw, a thread pitch of the screw, a type of head (e.g., rounded, flat, or the like) of the screw, a composition (e.g., metal, plastic, carbon fiber, or the like) of the screw, what other components include the screw, how the part (machine screw) is replaced, and the like. The edges may indicate how the different engine components are assembled and in what order they are assembled.

In the xbundle naming scheme, each element (context, vertex, or edge) is provided a name that includes the context identifier and the element's local identifier within the context. For example, in FIG. 3B, vertex 102 is provided a name 1.1, with the first "1" (before the ".") indicating the context identifier 322 of the context 134 and the second "1" (after the ".") indicating the local identifier 302. In the examples provided herein, "." is used as a delimiter to enable the context identifier to be distinguished from the local identifier, e.g., <context identifier>.<local identifier>. Of course, it should be understood that another type of delimiter may be used instead of ".". For example, in some cases, vertex 102 may be provided the name 1-1 (with "-" as the delimiter), the name 1_1 (with "_" as the delimiter), the name 1*1 (with "*" as the delimiter), the name 1•1 (with "•" as the delimiter), and so on. Using "." as the delimiter, vertex 104 is provided the name 1.2 (e.g., context identifier 1, local identifier 2), vertex 106 is provided the name 1.3 (e.g., context identifier 1, local identifier 3), vertex 108 is provided the name 1.4 (e.g., context identifier 1, local identifier 4), and vertex 132 is provided the name 1.5 (e.g., context identifier 1, local identifier 5). Edge 103 is provided the name 1.6 (e.g., context identifier 1, local identifier 6), edge 105 is provided the name 1.7 (e.g., context identifier 1, local identifier 7), edge 107 is provided the name 1.8 (e.g., context identifier 1, local identifier 8), edge 109 is provided the name 1.9 (e.g., context identifier 1, local identifier 9), and edge 111 is provided the name 1.10 (e.g., context identifier 1, local identifier 10).

Thus, in an xbundle, each element (e.g., context, vertex, and edge) is given a unique name with a particular context that includes the context identifier and a local identifier (e.g., within the context). For example, each name may be in the format <context identifier><delimiter><local identifier>, with the delimiter being a non-numeric character.

Figure 4B:
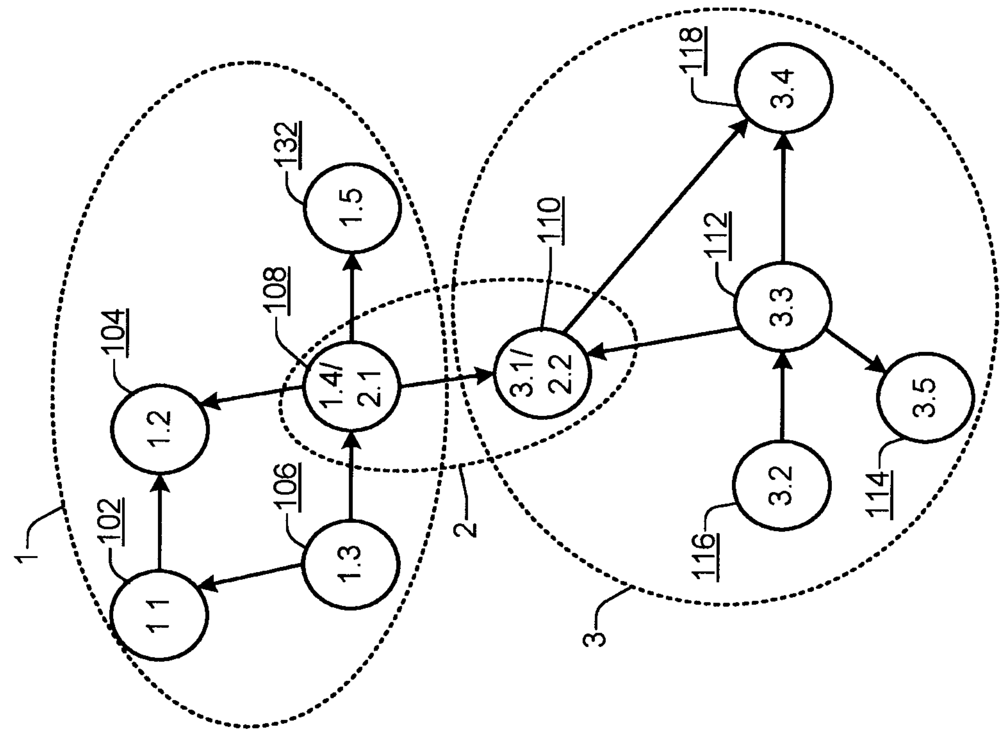
FIG. 4A and FIG. 4B illustrate an example of individual identifiers in multiple contexts, according to some embodiments.
Figure 4A:
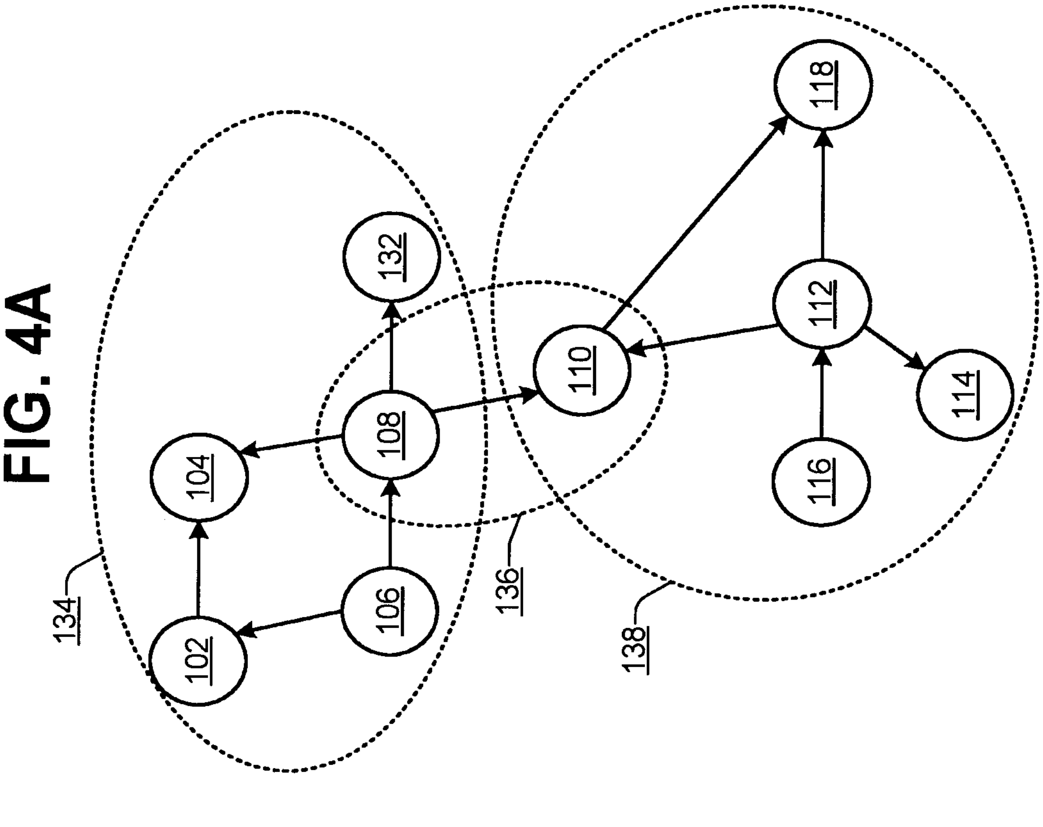

FIG. 4A and FIG. 4B illustrate an example of individual identifiers in multiple contexts, according to some embodiments. When a vertex (or an edge) is a member of more than one context, the vertex may be provided with a unique identifier for each context for which the vertex is a member. For example, a vertex (or edge) in a first context is provided a first unique identifier, the same vertex (or edge) in a second context is provided a second unique identifier, and so on.

FIG. 4A includes contexts 134, 136, and 138. Context 134 includes vertices 102, 104, 106, 108, and 132. Context 136 includes vertices 108 and 110. Context 138 includes vertices 110, 112, 114, 116, and 118. Thus, vertex 108 belongs to context 134 and context 136. Vertex 110 belongs to context 136 and context 138.

FIG. 4B illustrates an exemplary naming scheme for the vertices and contexts of FIG. 4A. It should be understood that this naming scheme purely for illustration purposes and that other naming schemes may be used. For example, context 134 is named context 1, context 136 is named context 2, and context 138 is named context 3.

In context 1, vertex 102 is named 1.1 (e.g., <context 1>.<vertex 1>), vertex 104 is named 1.2 (e.g., <context 1>.<vertex 2>), vertex 106 is named 1.3 (e.g., <context 1>.<vertex 3>), vertex 108 is named 1.4 (e.g., <context 1>.<vertex 4>), and vertex 132 is named 1.5 (e.g., <context 1>.<vertex 5>). In context 2, vertex 108 is named 2.1 (e.g., <context 2>.<vertex 1>) and vertex 110 is named 2.2 (e.g., <context 2>.<vertex 2>). In context 3, vertex 110 is named 3.1 (e.g., <context 3>.<vertex 1>), vertex 116 is named 3.2

(e.g., <context 3>.<vertex 2>), vertex 112 is named 3.3 (e.g., <context 3>.<vertex 3>), vertex 118 is named 3.4 (e.g., <context 3>.<vertex 4>), and vertex 114 is named 3.5 (e.g., <context 3>.<vertex 5>).

Thus, vertex 108 is named 1.4 with reference to context 1 and named 2.1 with reference to context 2. Vertex 110 is named 3.1 with reference to context 3 and named 2.2 with reference to context 2.2. Thus, when a vertex (or edge) has more than one name, each name indicates the context the vertex belongs to and the vertex's name within that context. For ease of understanding, the names of the edges are not shown in FIGS. 4A and 4B, but it should be understood that a naming scheme similar to the vertices may be used for the edges. Thus, a child xbundle at the intersection of two parent xbundles has two identifiers, with a first identifier associated with a first parent and a second identifier associated with the second parent.

Thus, xbundle provides an immutable data structure that can be used with parallel processing. Xbundle is easily scalable using any type of distributed key-value store. A key-value store (also known as a key-value database) is a data storage architecture designed for storing, retrieving, and managing associative arrays, and a data structure known as a dictionary or hash table. Dictionaries contain a collection of objects, or records, each of which in have different fields within them, each containing data. These records are stored and retrieved using a key that uniquely identifies the record, and is used to find the data within the database. Fine-grained hierarchical caching may be used to provide fast graph queries and searches. Another advantage of xbundle is that, in memory-limited environments, the graph detail gracefully degrades. For example, selecting a context to view additional details within the context does not cause the details of other contexts to be shown.

Figure 5:
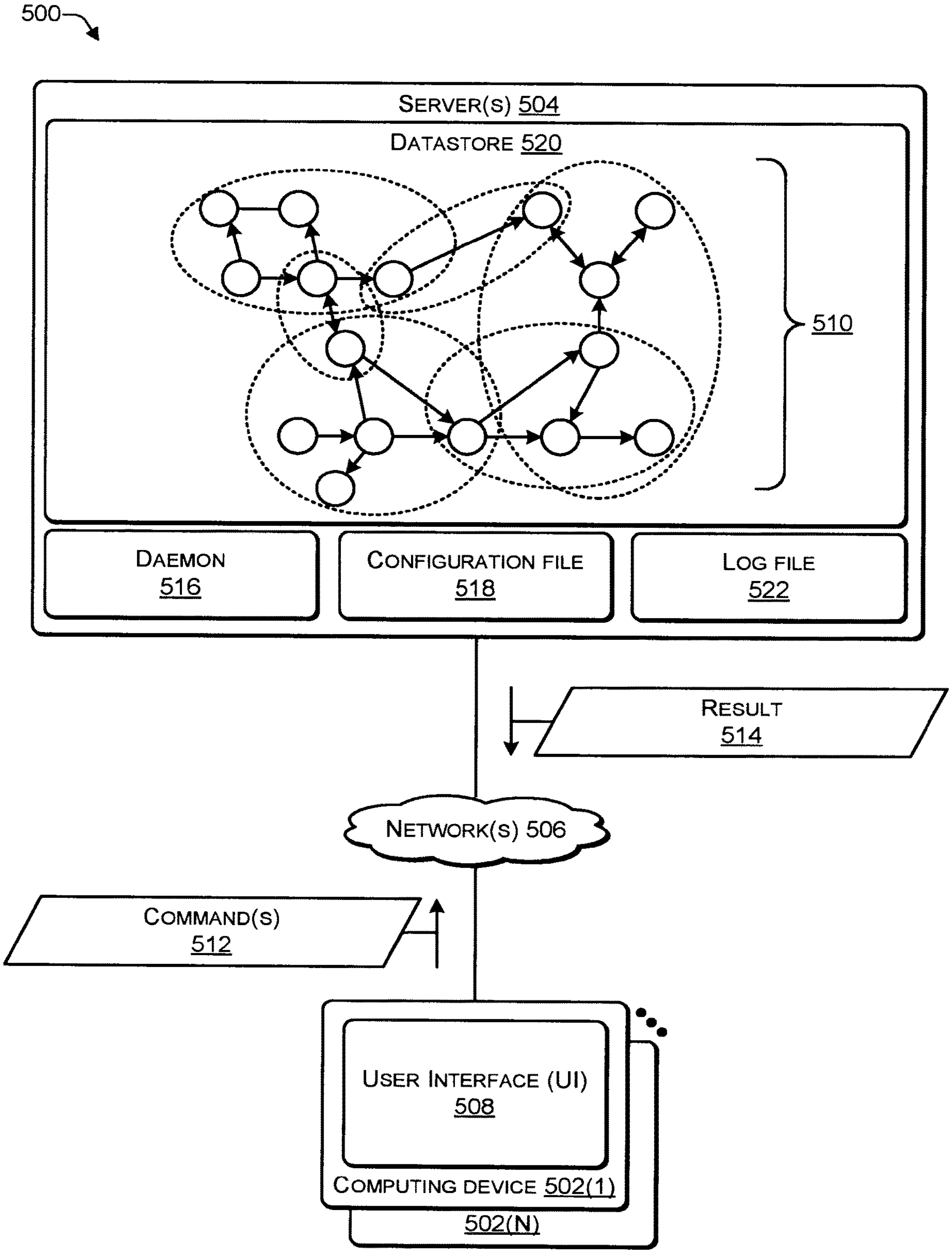
FIG. 5 is a block diagram of an architecture to interact with an xbundle, according to some embodiments.

FIG. 5 is a block diagram of an architecture 500 to interact with an xbundle, according to some embodiments. One or more computing devices 502(1) to 502(N) (N>0) are connected to a server 504 via one or more networks 506. Each computing device 502 may execute a user interface (UI) 508 to enable interaction with a datastore 520 hosted by the server 504. For example, the UI 508 may enable a user of the computing device 502(1) to send one or more commands 512 to the server 504. The commands 512 may perform one or more operations to the datastore 520, such as, for example, adding one or more elements (where an element is a vertex, an edge, a context, or any combination thereof) to an xbundle 510, deleting one or more elements from the xbundle 510, performing a query (e.g., a search performed to identify particular elements in the datastore 520), another type of operation, or any combination thereof. The server 504 may provide a result 514 of performing the commands 512 to the computing device 502 for display via the UI 508.

The xbundle 510 is a hierarchical graph data format and an immutable store. Graphs include graph fragments, know as xbundles. The xbundle 510 may be made up of other xbundles, including the most primitive form, an empty xbundle. Each xbundle has one of three possible roles: (1) a vertex, (2) an edge, or (3) a context. Each context is a workspace for performing xbundle operations.

Each xbundle is self-contained and has no references to external xbundles. The xbundle references its own children. To connect two xbundles together in a new graph, a new xbundle is created to include the relationship. Relationships between sibling children in a context are referred to as segments. When two xbundles, acting as nodes, are connected by a third xbundle acting as an edge, the edge is mapped to (1) an origin node and to (2) a target node. The segment is defined by the local identifiers of the three participating xbundles (e.g., (i) origin, (ii) target, and (iii) edge), as well as the mapping between the edge, the origin, and the target. The mapping specifies which child identifiers of the edge correspond to child identifiers in the endpoints.

The xbundle 510 is hierarchical. For example, as illustrated in the datastore 510, one or more xbundles may be included in one or more additional xbundles. The xbundle 510 may be decomposed by resolving the segments and mappings that compose the xbundle 510. By recursively resolving the child bundles and their children, an xbundle may be decomposed to the point where all segments consist of empty xbundles that cannot be resolved further. This is called flattening the xbundle.

Basic Operations

The following describes basic xbundle operations. Because of the hierarchical nature of xbundle, operations can be recursively performed to any depth and any breadth. For example, an operation can be performed to a child within another child within yet another child (3 levels of hierarchy). After the server 504 has been powered on, a user may initiate an xbundle daemon 516 by creating a valid xbundled.config file (e.g., configuration file 518) and providing a command:

bin/xbundled-start

A client connection, e.g., between the computing device 502 and the server 504, is initiated via the command:

bin/xbundle which causes a prompt to be displayed (e.g., via the UI 508):

xbundle>

Initially, an empty xbundle context may be created using the create command:

```
xbundle> :create
-- Empty bundle.
```

The empty xbundle that is created is the building block additional xbundles. When the empty xbundle is saved using a save command, the save command returns a three-part composite identifier (id) that is assigned to the xbundle:

```
xbundle> :save
26c80a7975807ebb 1fb7f3ed9d61793f 8becec594ffefd52
-- Empty bundle.
```

Note that "26c80a7975807ebb", "1fb7f3ed9d61793f", and "8becec594ffefd52" are three hash identifiers. Similar hash identifiers are used in the examples below and should be understood to be examples of hash identifiers and that actual identifiers may be different based on the hashing algorithm that is used.

The three-part composite id includes (1) a first id that comprises a hash of the topology, (2) a second id that comprises a hash of individual children of the xbundle, and (3) a third id that comprises a hash of (1), (2), and any attributes. The third hash is the unique id of the xbundle in the datastore 520.

All xbundles in the datastore 520, at any given point in time, may be displayed via an all command:

```
xbundle> :all
26c80a7975807ebb 1fb7f3ed9d61793f 8becec594ffefd52
-- Empty bundle.
```

If the user attempts to perform a save using the save command, the system determines that there is an identical xbundle in the datastore 520 with the same id, and provides a response indicating that a new entry was not created because the xbundle is already present:

```
xbundle> :save
Bundle 8becec594ffefd52 already present, not overwriting.
26c80a7975807ebb 1fb7f3ed9d61793f 8becec594ffefd52
-- Empty bundle.
```

To add an attribute to the current context (the empty bundle), an add attribute command is used:

```
xbundle> :add-attribute “foo” “bar”
** Attributes
foo: bar
-- Empty bundle.
```

Now that the current xbundle has been modified by adding an attribute, the current context can be saved using the save command:

```
xbundle> :save
26c80a7975807ebb 1fb7f3ed9d61793f eea094418f1df40f
** Attributes
foo: bar
-- Empty bundle.
```

Note that the first id (based on topology) and the second id (based on child xbundles) do not change, but the third id (based on the first two, plus any attributes) has changed due to the addition of the attribute. Thus, adding an attribute to the empty xbundle has created a new xbundle in the datastore 520. The server 504 may keep a log file 522 that includes all changes made to the datastore 520. For example, the log file 522 enables changes to be viewed and to be rolled back if the changes are undesireable. The presence of the new xbundle can be confirmed using the all command:

```
xbundle> :all
26c80a7975807ebb 1fb7f3ed9d61793f 8becec594ffefd52
-- Empty bundle.
26c80a7975807ebb 1fb7f3ed9d61793f eea094418f1df40f
** Attributes
foo: bar
-- Empty bundle.
```

Creating A Simple Segment

The following illustrates the creation of a simple segment made up of three empty xbundles, with two xbundles serving as nodes and one xbundle serving as an edge. The server 504 and the computing device 502 should be running.

The create command (e.g., one of the commands 512) is used to create a new xbundle context:

```
xbundle> :create
-- Empty bundle.
```

If an empty xbundle is not present in the datastore 520, then the save command is used to create the empty xbundle:

```
xbundle> :save
26c80a7975807ebb 1fb7f3ed9d61793f 8becec594ffefd52
-- Empty bundle.
```

The add-child command is used to add a child node to the xbundle. In this example, three child nodes are added using the add-child command three times:

```
xbundle> :add-child “8becec594ffefd52”
-- Children
  0 8becec594ffefd52
xbundle> :add-child “8becec594ffefd52”
-- Children
  0 8becec594ffefd52
  1 8becec594ffefd52
xbundle> :add-child “8becec594ffefd52”
-- Children
  0 8becec594ffefd52
  1 8becec594ffefd52
  2 8becec594ffefd52
```

A segment (e.g., two vertices and the edge connecting them) is created from the three children, while leaving the origin and target mappings empty, using an add-segment command:

```
xbundle> :add-segment 0 1 2 [ ] [ ]
-- Children
  0 8becec594ffefd52
  1 8becec594ffefd52
  2 8becec594ffefd52
-- Segments
[0 1 2] O: [ ], T: [ ]
```

The save command is used to save the current context:

```
xbundle> :save
53e0664c22382093 cedd42de3bb4efe3 cb9edbb4dde4e298
-- Children
  0 8becec594ffefd52
  1 8becec594ffefd52
  2 8becec594ffefd52
-- Segments
[0 1 2] O: [ ], T: [ ]
```

Creating A Complex Segment

After creating a simple segment, as described above, the following may be used to create a complex segment. The create command is used to create an empty context:

```
xbundle> :create
-- Empty bundle.
```

The add-child command is used to add 3 instances of a simple segment:

```
xbundle> :add-child "cb9edbb4dde4e298"
-- Children
  0 cb9edbb4dde4e298
xbundle> :add-child "cb9edbb4dde4e298"
-- Children
  0 cb9edbb4dde4e298
  1 cb9edbb4dde4e298
xbundle> :add-child "cb9edbb4dde4e298"
-- Children
  0 cb9edbb4dde4e298
  1 cb9edbb4dde4e298
  2 cb9edbb4dde4e298
```

The add-segment command is used to add a segment connecting node 0 to node 1 via node 2, map child 1 of node 0 (the origin) to child 0 of node 2 (the edge), and map child 0 of node 1 (the target) to child 1 of node 2:

```
xbundle> :add-segment 0 1 2 [[1,0]] [[0,1]]
-- Children
  0 cb9edbb4dde4e298
  1 cb9edbb4dde4e298
  2 cb9edbb4dde4e298
-- Segments
[0 1 2] O: [[1 0]], T: [[0 1]]
```

The current context is saved using the save command:

```
xbundle> :save
72a509aadb7e18da 68f3905642920824 86113c5fd58eb4c6
-- Children
  0 cb9edbb4dde4e298
  1 cb9edbb4dde4e298
  2 cb9edbb4dde4e298
-- Segments
[0 1 2] O: [[1 0]], T: [[0 1]]
```

Xbundle Query Operations

Figure 6:
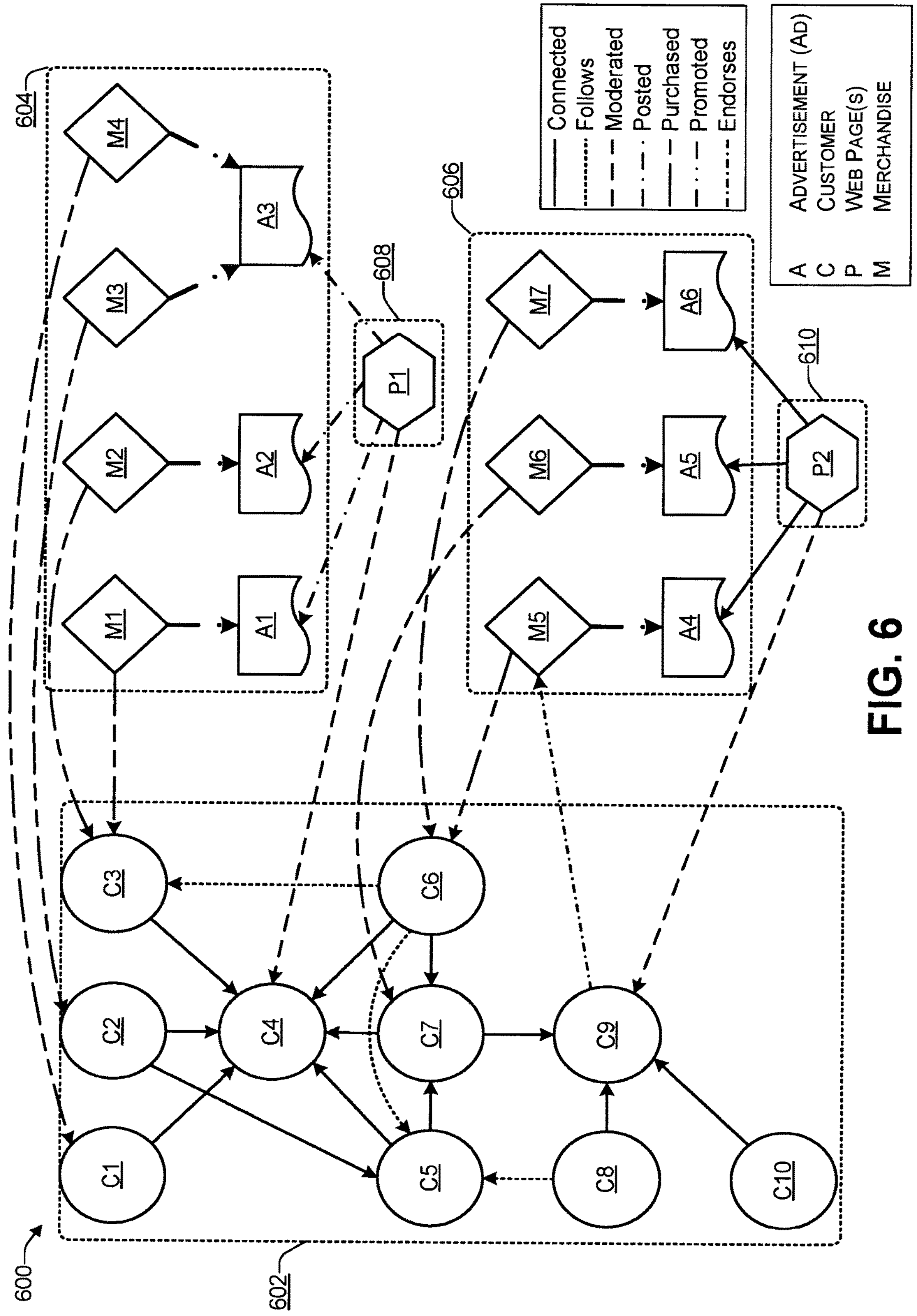
FIG. 6 is a block diagram illustrating performing queries associated with an xbundle, according to some embodiments.

FIG. 6 is a block diagram 600 illustrating performing queries associated with an xbundle, according to some embodiments. FIG. 6 includes customers ("Cn", n>0), e.g., C1, C2, C3, C4, C5, C6, C7, C8, C9, C10), merchandise ("Mn", n>0, e.g., M1, M2, M3, M4, M5, M6, M7), advertisements ("An", n>0, e.g., A1, A2, A3, A4, A5, A6), and ("Pn", n>0, e.g., P1, P2) and relationships between individual customers, merchandise, advertisements ("ads"), and pages. Assume merchandise M1, M2, M3, M4 are associated with Brand A and merchandise M5, M6, M7 are associated with Brand B.

FIG. 6 illustrates typical types queries of that can be performed to an xbundle architecture. The example illustrated in FIG. 6 is that of a network formed by a brand, its products and advertising, and the consumers that interact with it. Several example queries are described, including: (i) connect customers, directly or indirectly, to an endorser of a brand, (ii) determine customers of the brand, (iii) count a number of customers of the brand, (iv) determine fans of the brand, e.g., where a fan is a customer that monitors the brand page and endorses the brand's merchandise, (v) determine products of the brand that have gone "viral", e.g., products of the brand that have been purchased, endorsed, or both by fans that are connected to the brand, and (vi) determine consumers that purchase products of the brand that have gone "viral".

Assume that the vertices and edges in FIG. 6 are stored as leaves (lowest level entities, with no children themselves) in an xbundle database. It should be understood that the example illustrated in FIG. 6 may be extended to include higher-level abstractions, such as, for example, the brands themselves, all consumers, publishers of pages on which brand advertising appears (or has appeared), and the like. In such an extended example, queries may be performed on the higher-level abstractions in the same way that they are performed on the leaves (e.g., leaf entities). For example, a query may be created to determine all publishers displaying ads among one or more sites (e.g., web sites) for a competing brand. Such a query could be implemented for a conventional graph database, but the query would be more complex and computationally intensive as the query would process many more vertices and edges and their accompanying attributes as compared to an xbundle.

An advantage of xbundle over a conventional graph is that higher level relationships can be included and queried. For example, in FIG. 6, the customers C1 to C10 are in a context 602. Merchandise M1 to M4 and associated advertisements A1, A2, A3 are in a context 604. Merchandise M5, M6, M7 and associated advertisements A4, A5, A6 are in a context 606, a set of one or more web page(s) P1 is in a context 608, and a set of one or more web page(s) P2 is in a context 610. Assume merchandise M1, M2, M3, M4 are associated with Brand A and merchandise M5, M6, M7 are associated with Brand B. Thus, in FIG. 6, the brands themselves, the body of consumers (C1 to C10), and the publishers 608, 610 of the web pages P1, P2, respectively, on which brand advertising appears are higher-level abstractions. Queries on these higher-level abstractions may be performed in the same way that queries are performed on the lower-level elements (e.g., leaves). For example, a query may be used to determine all publishers displaying ads (anywhere among their web pages) for a competing brand. In a conventional graph database, such a query would be more complex and more computationally intensive as the query would process many more vertices and edges and their accompanying attributes. In contrast, in an xbundle architecture, the query can be completed at a higher-level, without involving lower-level elements, as illustrated in FIG. 7.

Figure 7:
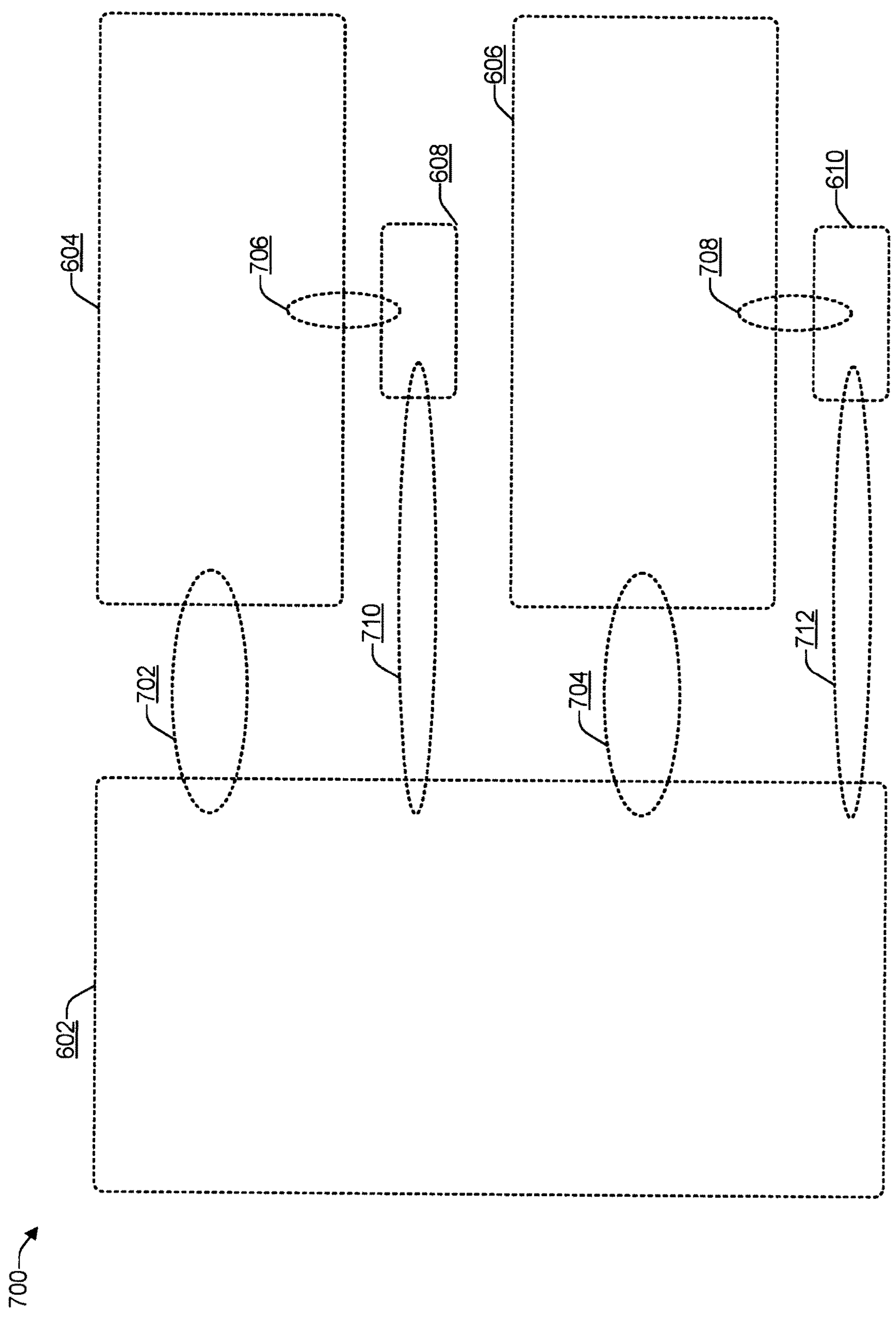
FIG. 7 is a block diagram illustrating a higher-level view of an xbundle, according to some embodiments.

FIG. 7 is a block diagram 700 illustrating a higher-level view of an xbundle, according to some embodiments. FIG. 7 shows the context 602 (all customers), context 604 (merchandise M1, M2, M3, M4 and associated advertisements A1, A2, A3), context 606 (merchandise M5, M6, M7 and associated advertisements A4, A5, A6), context 608 (web page(s) P1), and context 610 (web page(s) P2). In FIG. 7, the contexts 602, 604, 606, 608, and 610 are viewed, at a higher-level, as vertices.

FIG. 7 also includes contexts 702, 704, 706, 708, 710, and 712 that, when viewed at a higher-level, are edges. For example, 702 may be viewed as an edge from 602 to 604, 704 may be viewed as an edge from 602 to 606, 706 may be viewed as an edge from 604 to 608, 708 may be viewed as an edge from 606 to 610, 710 may be viewed as an edge from 608 to 602, and 712 may be viewed as an edge from 610 to 602.

Contexts 702, 704, 706, 708, 710, 712 were not illustrated in FIG. 6 for case of understanding. However, it should be understood that 702, viewed as a context in FIG. 6, includes the edge from M1 to C3, the edge from M2 to C3, the edge from M3 to C2, and the edge from M4 to C1. 704, viewed as a context in FIG. 6, includes the edge from M5 to C6, the edge from M6 to C7, the edge from M7 to C6, and the edge from C9 to M5. 706, viewed as a context in FIG. 6, includes the edge from P1 to A1, P1, to A2, and P1 to A3. 708, viewed as a context in FIG. 6, includes the edge from P2 to A4, the edge from P2 to A5, and the edge from P2 to A6. 710, viewed as a context, includes the edge from P1 to C4. 712, viewed as a context, includes the edge from P2 to C9. A conventional graph database has to go through all the vertices to see if any of them are connected (or to ensure that none of them are, to find unconnected components). By representing the conventional graph database as hierarchical xbundles, the size of the graph to search becomes much smaller. For example, using an xbundle for route-finding in a navigation app results in fewer operations.

Thus, queries at the higher-level can, in many cases, be resolved much faster and with less computational resource usage as compared to a conventional graph-based database. For example, all customers can be determined by determining the context 602, without having to process C1, C2, C3, C4, C5, C6, C7, C8, C9, and C10 as in a conventional database (e.g., a single operation vs 10 operations). All merchandise and associated advertisements can be determined by determining context 604 and 606, without having to individually identify M1, M2, M3, M4, M5, M6, M7, A1, A2, A3, A4, A5, and A6 as in a conventional database (e.g., two operations rather than 13 operations). The connections between merchandise and customers can be determined by determining context 710 and 712, without having to individually identify the individual edges (e.g., M1 to C3, M2 to C3, M3 to C2, M4 to C1, M5 to C6, M6 to C7, M7 to C6, C9 to M5) resulting in 2 operations rather than 8 operations.

Figure 8:
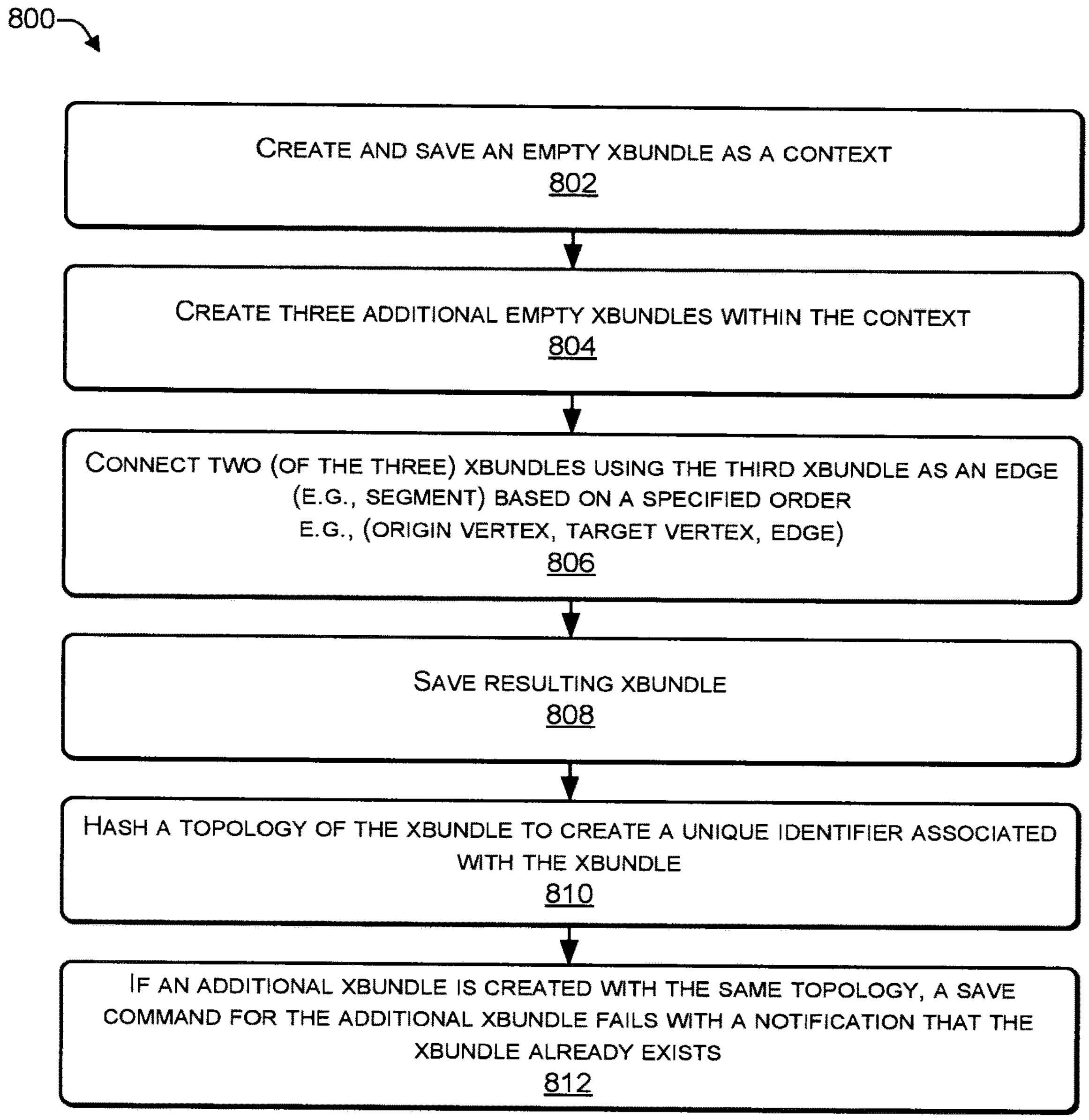
FIG. 8 is a flowchart of a process that includes connecting two xbundles with a third xbundle, according to some embodiments.
Figure 9:
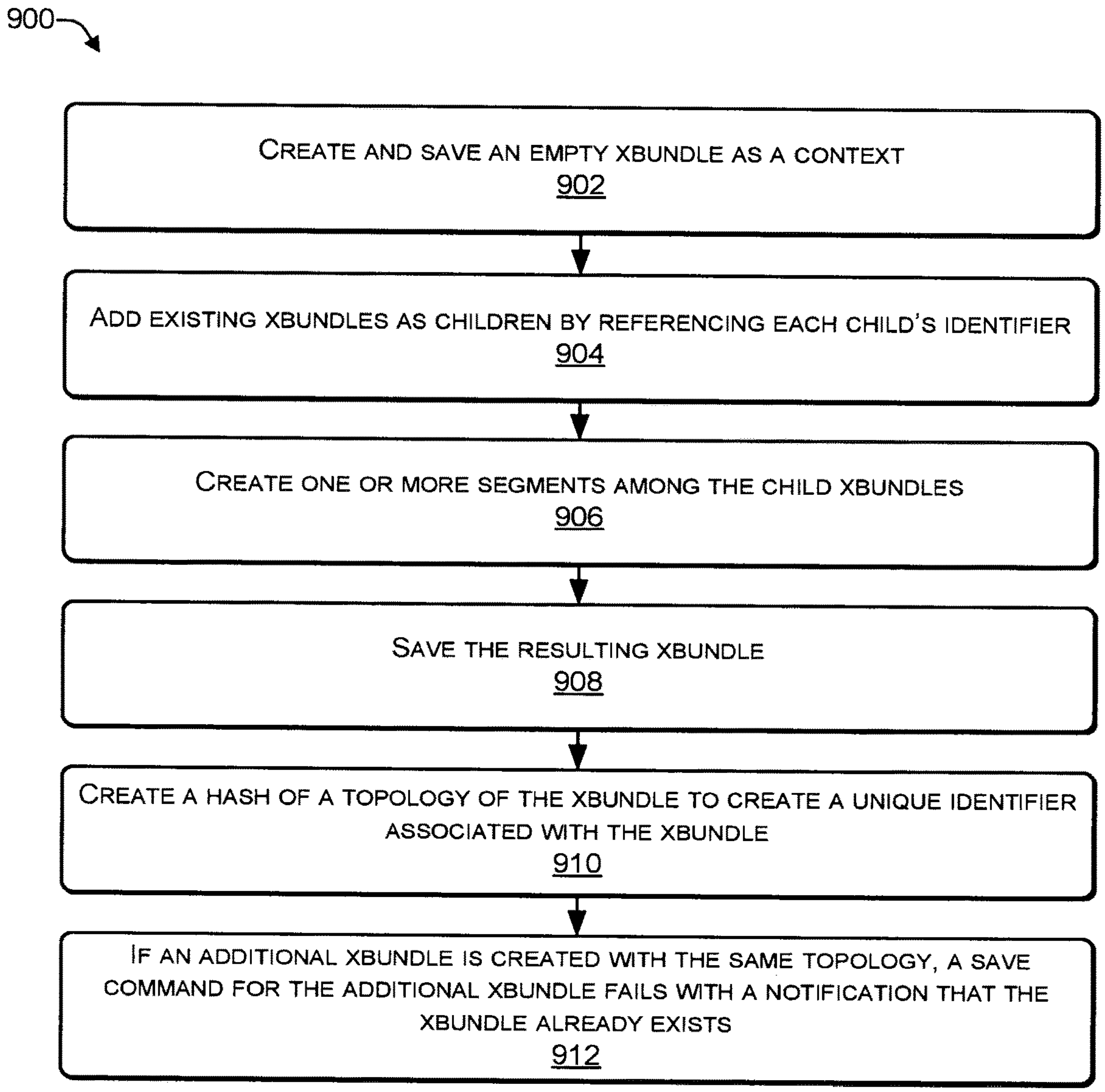
FIG. 9 is a flowchart of a process that includes adding one or more existing xbundles as children to a particular xbundle, according to some embodiments.
Figure 10:
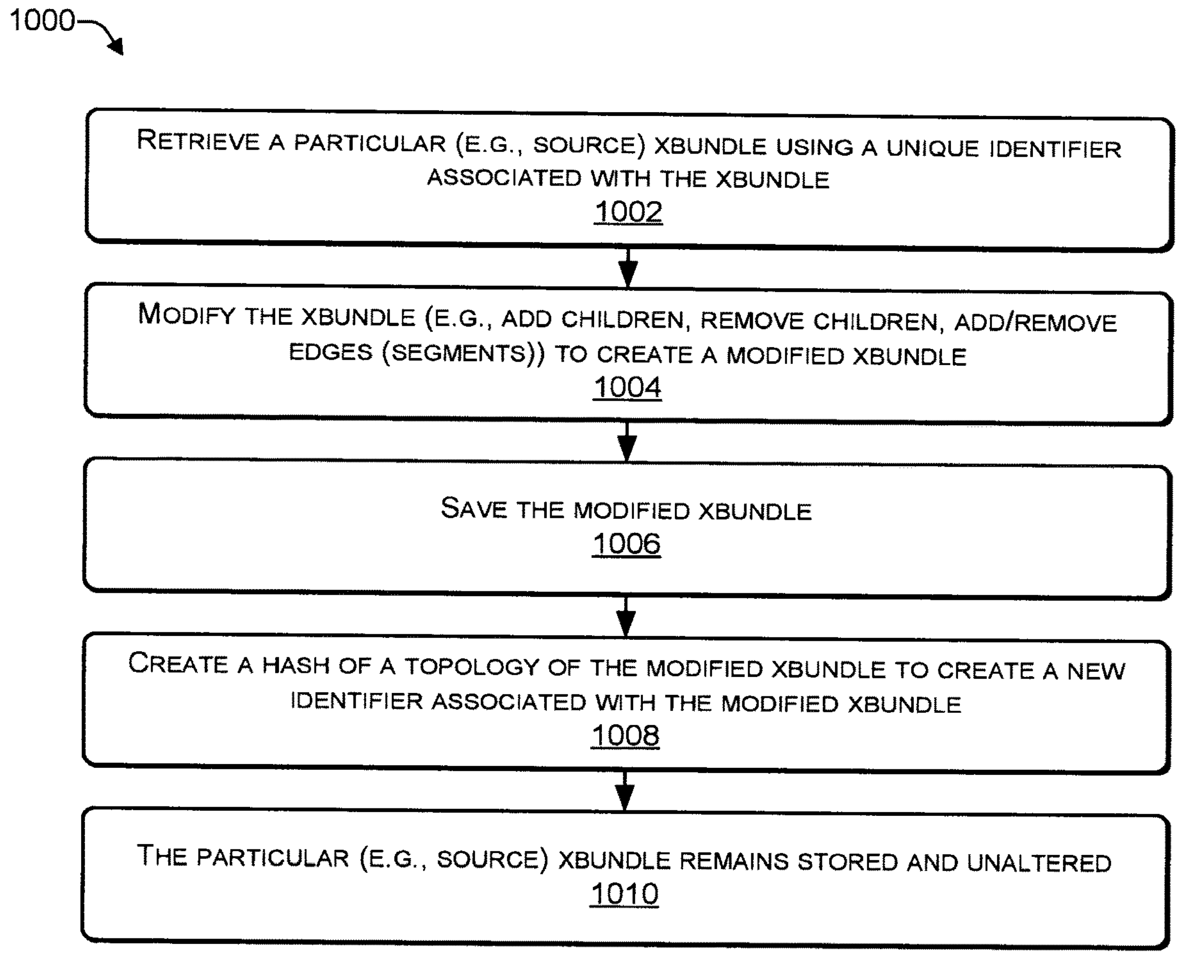
FIG. 10 is a flowchart of a process to modify an xbundle to create a modified xbundle, according to some embodiments.

In the flow diagrams of FIGS. 8, 9, and 10 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 800, 900, and 1000 are described with reference to FIGS. 1, 2, 3, 4, 5, 6, and 7 as described above, although other models, frameworks, systems and environments may be used to implement this process.

FIG. 8 is a flowchart of a process 800 that includes connecting two xbundles with a third xbundle, according to some embodiments. The process 800 may be performed by a server, such as the server 504 of FIG. 5.

At 802, the process may create and save an empty xbundle as a context. For example, in FIG. 3A and FIG. 5, in response to receiving a create command (e.g., in the commands 512) from the computing device 502(N), the server 504 may create the context 134 in the datastore 520.

At 804, the process may create three additional empty xbundles within the context. At 806, the process may connect two (of the three) xbundles using the third xbundle as a segment based on a specified order, e.g., (origin vertex, target vertex, edge). For example, in FIG. 3A and FIG. 5, in response to receiving additional create commands (e.g., in the commands 512) from the computing device 502(N), the server 504 may create xbundle vertices 102 and 104 in the datastore 520. In response to receiving yet another create command (e.g., in the commands 512) from the computing device 502(N), the server 504 may create xbundle edge 103 that goes from 102 to 104. For example, the command:

xbundle>:create (102, 104, 103)

causes the server 104 to create the edge 103 from vertex 102 to vertex 104.

At 808, the resulting xbundle may be saved (e.g., in a datastore). At 810, a typology of the xbundle is hashed to provide the xbundle unique type identifier. At 812, if an additional xbundle is created with the same topology, a save request for the additional xbundle will fail with the notification that the xbundle already exists. For example, in FIG. 5, a save command performed after creating the context 134, the vertex 102, the vertex 104, and the edge 103 from vertex 102 to vertex 104 causes the xbundles 102, 103, 104, and 134 to be saved in the datastore 520. The server 504 creates a unique type identifier for the saved xbundles and provides the type identifier associated with the saved xbundles as the result 514 to the computing device 502(N) (e.g., for display to the user via the UI 508). An attempt to create and save an xbundle with the same topology results in the server 504 indicating (via the result 514) that such an xbundle already exists:

bundle<identifier>already present, not overwriting

Thus, a simple xbundle may be created by creating a context, creating two vertices in the context, and creating an edge connecting the two vertices. If the data being stored has a directional component, then the order in which the vertices are specified may be used to create a directed edge. If the data does not include a directional component, the order in which the vertices are specified may be ignored, or a directed edge may be added based on the order in which the vertices are specified and the direction of the edge may be ignored (e.g., when searching the xbundle or retrieving data from the xbundle).

FIG. 9 is a flowchart of a process 900 that includes adding one or more existing xbundles as children to a particular xbundle, according to some embodiments. The process 900 may be performed by a server, such as the server 504 of FIG. 5.

At 902, the process may create and save an X bundle of the context. At 904, the process may add existing bundles as children by referencing each child's type identifier. For example:

The create command (e.g., one of the commands 512) is used to create a new xbundle context:

```
xbundle> :create
-- Empty bundle.
```

If an empty xbundle is not present in the datastore 520, then the save command is used to create the empty xbundle:

```
xbundle> :save
26c80a7975807ebb 1fb7f3ed9d61793f 8becec594ffefd52
-- Empty bundle.
```

The add-child command is used to add a child node to the xbundle. In this example, three child nodes are added using the add-child command three times:

```
xbundle> :add-child "8becec594ffefd52"
-- Children
  0 8becec594ffefd52
xbundle> :add-child "8becec594ffefd52"
-- Children
  0 8becec594ffefd52
  1 8becec594ffefd52
```

-continued

```
xbundle> :add-child "8becec594ffefd52"
-- Children
  0 8becec594ffefd52
  1 8becec594ffefd52
  2 8becec594ffefd52
```

For example, in FIG. 3A and FIG. 5, the create command (e.g., in the commands 512) may be used to create the context 134 and the child nodes 102, 103, 104.

At 906, the process may create one or more segments among the child X bundles, e.g., using an add-segment command:

```
xbundle> :add-segment 0 1 2 [ ] [ ]
-- Children
  0 8becec594ffefd52
  1 8becec594ffefd52
  2 8becec594ffefd52
-- Segments
[0 1 2] O: [ ], T: [ ]
```

Here, "0", "1", and "2" are the names of the children along with their corresponding hash identifiers. "[ ]" indicates that each child is an empty xbundle. At higher levels, each child may not be empty but at the lowest level, each child is empty.

At 908, the process may save the resulting X bundle (e.g., in a datastore). At 910, the process may hash a typology of the X bundle create a unique identifier associated with the X bundle.

```
xbundle> :save
53e0664c22382093 cedd42de3bb4efe3 cb9edbb4dde4e298
-- Children
  0 8becec594ffefd52
  1 8becec594ffefd52
  2 8becec594ffefd52
-- Segments
[0 1 2] O: [ ], T: [ ]
```

At 912, if an additional X bundle is created with the same typology, a save command for the additional X bundle fails with the notification that the X bundle already exists. An attempt to create and save an xbundle with the same topology results in the server 504 indicating (via the result 514) that such an xbundle already exists:

bundle<identifier>already present, not overwriting

Thus, an xbundle may be created by creating a context. Individual elements (vertices or edges) may be created and added to the context as child nodes using an add-child command. Some of the children may be used as vertices while other children may be used as segments (e.g., edges) that connect two vertices. When a save command is received to save an xbundle (e.g., context and children with segments), the topology of the xbundle is hashed and the resulting hash is used as a unique identifier for the xbundle. An attempt to create and save an xbundle with the same topology results in the server indicating that such an xbundle already exists:

bundle<identifier>already present, not overwriting

FIG. 10 is a flowchart of a process 1000 to modify an xbundle to create a modified xbundle, according to some embodiments. The process 1000 may be performed by a server, such as the server 504 of FIG. 5.

At 1002, the process may retrieve a particular (e.g., previously stored or source) xbundle using a unique identifier (e.g., hash) that is associated with the xbundle. At 1004, the process may modify the (retrieved) xbundle (e.g., by adding one or more children, removing one or more children, adding one or more segments, removing one or more segments, or any combination thereof) to create a modified xbundle. At 1006, the process may save the modified xbundle. At 1008, the particular (e.g., source) xbundle remains stored (e.g., in a datastore), unaltered.

For example, in FIG. 3A and FIG. 5, executing the commands 512 may cause the server 504 to retrieve 102, 103, 104, that are in context 134, add vertices 106, 108, 132, add edges (e.g., segments) 105, 107, 109, 111, and store the modified xbundle in the datastore 520.

Thus, a process may receive commands that cause the process to retrieve an xbundle from a datastore, modify the xbundle, and store the modified xbundle in the datastore. The original (e.g., source) xbundle remains in the datastore, unaltered. Thus, after the process is complete, the datastore includes both the modified xbundle and the original xbundle.

Figure 11:
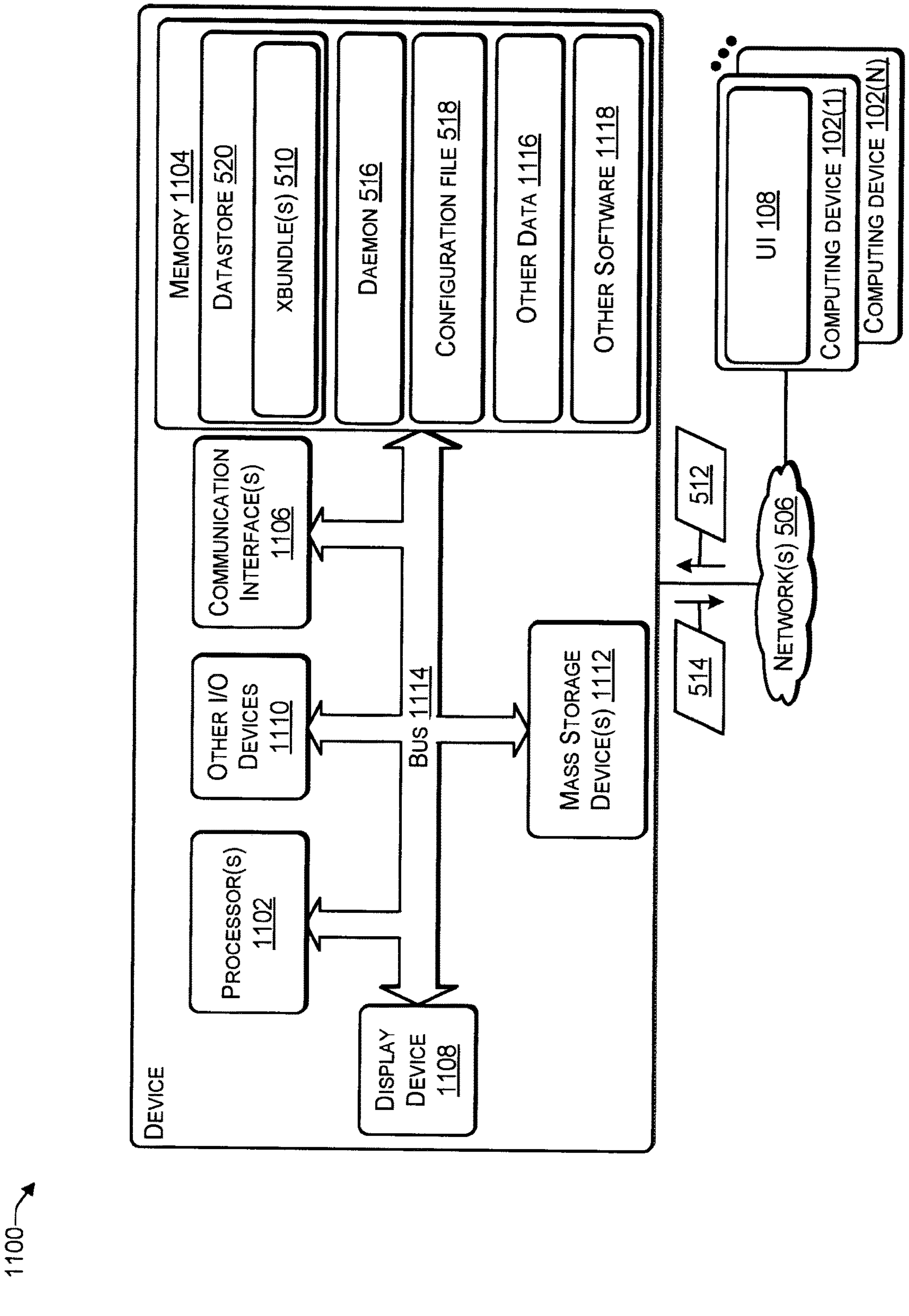
FIG. 11 illustrates an example configuration of a computing device that can be used to implement the systems and techniques described herein.

FIG. 11 illustrates an example configuration of a device 1100 that can be used to implement the systems and techniques described herein, such as for example, the computing devices 502 or the server(s) 504 of FIG. 5. For illustration purposes, the device 1100 is illustrated as implementing the server 504 of FIG. 5.

The device 1100 may include one or more processors 1102 (e.g., CPU, GPU, or the like), a memory 1104, communication interfaces 1106, a display device 1108, other input/output (I/O) devices 1110 (e.g., keyboard, trackball, and the like), and one or more mass storage devices 1112 (e.g., disk drive, solid state disk drive, or the like), configured to communicate with each other, such as via one or more system buses 1114 or other suitable connections. While a single system bus 1114 is illustrated for ease of understanding, it should be understood that the system buses 1114 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 1102 are one or more hardware devices that may include a single processing unit or a number of processing units, all of which may include single or multiple computing units or multiple cores. The processors 1102 may include a graphics processing unit (GPU) that is integrated into the CPU or the GPU may be a separate processor device from the CPU. The processors 1102 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1102 may be configured to fetch and execute computer-readable instructions stored in the memory 1104, mass storage devices 1112, or other computer-readable media.

Memory 1104 and mass storage devices 1112 are examples of computer storage media (e.g., memory storage devices) for storing instructions that can be executed by the processors 1102 to perform the various functions described herein. For example, memory 1104 may include both volatile memory and non-volatile memory (e.g., RAM, ROM, or the like) devices. Further, mass storage devices 1112 may include hard disk drives, solid-state drives, removable media, including external and removable drives, memory cards, flash memory, floppy disks, optical disks (e.g., CD, DVD), a storage array, a network attached storage, a storage area network, or the like. Both memory 1104 and mass storage devices 1112 may be collectively referred to as memory or computer storage media herein and may be any type of non-transitory media capable of storing computer-readable, processor-executable program instructions as computer program code that can be executed by the processors 1102 as a particular machine configured for carrying out the operations and functions described in the implementations herein.

The device 1100 may include one or more communication interfaces 1106 for exchanging data via the network 506. The communication interfaces 1106 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 1106 can also provide communication with external storage, such as a storage array, network attached storage, storage area network, cloud storage, or the like.

The display device 1108 may be used for displaying content (e.g., information and images) to users. Other I/O devices 1110 may be devices that receive various inputs from a user and provide various outputs to the user, and may include a keyboard, a touchpad, a mouse, a printer, audio input/output devices, and so forth.

The computer storage media, such as memory 116 and mass storage devices 1112, may be used to store software and data, including, for example, the datastore 520, the xbundles 510, the daemon 516, the configuration files 518, other data 1116, and other software 1118. For case of illustration, not all the software and data associated with the server 106 are shown.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:

receiving, by one or more processors of a server, one or more commands from a computing device, the one or more commands including a request to create a particular xbundle comprising a hierarchical graph to store data;

creating, by the one or more processors, an empty xbundle comprising a context;

creating, by the one or more processors, a set of additional empty xbundles within the context, the set of additional empty xbundles including at least a first xbundle, a second xbundle, and a third xbundle;

connecting, by the one or more processors, the first xbundle to the second xbundle using the third xbundle to create a particular xbundle, wherein:

the first xbundle comprises a first vertex representing first data;

the second xbundle comprises a second vertex representing second data; and the third xbundle comprises an edge connecting the first xbundle to the second xbundle, wherein the first vertex is connected to the second vertex by the edge comprises a segment, and wherein the edge represents a relationship between the first data and the second data; and saving in a datastore, by the one or more processors, the particular xbundle comprising the context that includes the first xbundle, the second xbundle, and the third xbundle;

receiving, by the one or more processors, a query specifying a search context;

retrieving the search context; and recursively resolving child xbundles included in the search context until either:

the query is satisfied; or further resolution is not possible.

2. The method of claim 1, further comprising:

generating a first hash of a topology of the particular xbundle; and generating a second hash of children of the particular xbundle;

combining the first hash and the second hash to create a combined hash; and sending to the computing device the combined hash, and an indication that the particular xbundle was saved.

3. The method of claim 2, further comprising:

associating the combined hash with the particular xbundle, the combined hash comprising a unique type identifier to identify a type of the particular xbundle.

4. The method of claim 2, further comprising:

retrieving, using the combined hash, the particular xbundle from the datastore;

modifying the particular xbundle to create a modified xbundle; and based at least in part on receiving a save command, saving the modified xbundle in the datastore, wherein the datastore includes both the particular xbundle and the modified xbundle.

5. The method of claim 4, wherein modifying the particular xbundle to create the modified xbundle comprises:

adding a new child to the particular xbundle;

deleting a current child from the particular xbundle; or any combination thereof.

6. The method of claim 4, wherein modifying the particular xbundle to create the modified xbundle comprises:

adding a new edge to the particular xbundle to connect two vertices, wherein the new edge has no direction, one direction, or two directions;

deleting a current edge from the particular xbundle; or any combination thereof.

7. The method of claim 1, further comprising:

receiving, from the computing device, an add-child command that includes:

a first identifier associated with a first previously stored xbundle; and a second identifier associated with a second previously stored xbundle; and adding the first previously stored xbundle as a child to the second previously stored xbundle.

8. One or more non-transitory computer-readable media storing instructions executable by one or more processors to perform operations comprising:

receiving one or more commands from a computing device, the one or more commands including a request to create a particular xbundle comprising a hierarchical graph to store data;

creating an empty xbundle comprising a context;

creating a set of additional empty xbundles within the context, the set of additional empty xbundles including at least a first xbundle, a second xbundle, and a third xbundle;

connecting the first xbundle to the second xbundle using the third xbundle to create a particular xbundle, wherein:

the first xbundle comprises a first vertex representing first data;

the second xbundle comprises a second vertex representing second data; and the third xbundle comprises an edge connecting the first xbundle to the second xbundle, wherein the first vertex is connected to the second vertex by the edge comprises a segment, and wherein the edge represents a relationship between the first data and the second data; and saving, in a datastore, the particular xbundle comprising the context that includes the first xbundle, the second xbundle, and the third xbundle;

receiving, by the one or more processors, a query specifying a search context;

retrieving the search context; and recursively resolving child xbundles included in the search context until either:

the query is satisfied; or further resolution is not possible.

9. The one or more non-transitory computer readable media of claim 8, the operations further comprising:

generating a first hash of a topology of the particular xbundle;

generating a second hash of children of the particular xbundle;

combining the first hash and the second hash to create a combined hash;

and sending, to the computing device, the combined hash and an indication that the particular xbundle was saved.

10. The one or more non-transitory computer readable media of claim 9, the operations further comprising:

associating the combined hash with the particular xbundle, the combined hash comprising a unique type identifier to identify a type of the particular xbundle.

11. The one or more non-transitory computer readable media of claim 9, the operations further comprising:

retrieving, using the combined hash, the particular xbundle from the datastore;

modifying the particular xbundle by adding a new child to the particular xbundle to create a modified xbundle; and based at least in part on receiving a save command, saving the modified xbundle in the datastore, wherein the datastore includes both the particular xbundle and the modified xbundle.

12. The one or more non-transitory computer readable media of claim 11, wherein:

the new child comprises one or more additional children, each of the one or more additional children comprising at least one of an additional vertex or an additional edge.

13. The one or more non-transitory computer readable media of claim 11, wherein modifying the particular xbundle to create the modified xbundle comprises:

adding a new edge to the particular xbundle to connect two vertices, wherein the new edge has no direction, one direction, or two directions;

deleting a current edge from the particular xbundle; or any combination thereof.

14. The one or more non-transitory computer readable media of claim 8, the operations further comprising:

receiving, from the computing device, an add-child command that includes:

a first identifier associated with a first previously stored xbundle; and a second identifier associated with a second previously stored xbundle; and adding the first previously stored xbundle as a child to the second previously stored xbundle.

15. A server comprising:

one or more processors; and one or more non-transitory computer-readable storage media to store instructions executable by the one or more processors to perform operations comprising:

receiving one or more commands from a computing device, the one or more commands including a request to create a particular xbundle comprising a hierarchical graph to store data;

creating an empty xbundle comprising a context;

creating a set of additional empty xbundles within the context, the set of additional empty xbundles including at least a first xbundle, a second xbundle, and a third xbundle;

connecting the first xbundle to the second xbundle using the third xbundle to create a particular xbundle, wherein:

the first xbundle comprises a first vertex representing first data;

the second xbundle comprises a second vertex representing second data; and the third xbundle comprises an edge connecting the first xbundle to the second xbundle, wherein the first vertex is connected to the second vertex by the edge comprises a segment; and saving, in a datastore, the particular xbundle comprising the context that includes the first xbundle, the second xbundle, and the third xbundle;

receiving, by the one or more processors, a query specifying a search context;

retrieving the search context; and recursively resolving child xbundles included in the search context until either:

the query is satisfied; or further resolution is not possible.

16. The server of claim 15, the operations further comprising:

generating a first hash of a topology of the particular xbundle;

generating a second hash of children of the particular xbundle;

combining the first hash and the second hash to create a combined hash;

and sending, to the computing device, the combined hash and an indication that the particular xbundle was saved.

17. The server of claim 16, the operations further comprising:

associating the combined hash with the particular xbundle, the combined hash comprising a unique type identifier to identify a type of the particular xbundle.

18. The server of claim 16, the operations further comprising:

retrieving, using the combined hash, the particular xbundle from the datastore;

modifying the particular xbundle to create a modified xbundle; and based at least in part on receiving a save command, saving the modified xbundle in the datastore, wherein the datastore includes both the particular xbundle and the modified xbundle.

19. The server of claim 18, wherein modifying the particular xbundle to create the modified xbundle comprises:

adding a new child to the particular xbundle;

deleting a current child from the particular xbundle;

adding a new edge to the particular xbundle to connect two vertices, wherein the new edge has no direction, one direction, or two directions;

deleting a current edge from the particular xbundle; or any combination thereof.

20. The server of claim 15, wherein:

the first vertex includes a second segment comprising a third vertex connected to a fourth vertex by a second edge.

* * * * *